United States Patent
Hancock

(10) Patent No.: US 10,409,895 B2
(45) Date of Patent: Sep. 10, 2019

(54) OPTIMIZING A DOCUMENT BASED ON DYNAMICALLY UPDATING CONTENT

(71) Applicant: QUALTRICS, LLC, Provo, UT (US)

(72) Inventor: Owen Hancock, Seattle, WA (US)

(73) Assignee: Qualtrics, LLC, Provo, UT (US)

(*) Notice: Subject to any disclaimer, the term of this patent is extended or adjusted under 35 U.S.C. 154(b) by 0 days.

(21) Appl. No.: 15/785,750

(22) Filed: Oct. 17, 2017

(65) Prior Publication Data

US 2019/0114308 A1    Apr. 18, 2019

(51) Int. Cl.
| | | |
|---|---|---|
| *G06F 17/21* | (2006.01) | |
| *G06F 17/24* | (2006.01) | |
| *G06F 3/0484* | (2013.01) | |
| *G06T 11/20* | (2006.01) | |

(52) U.S. Cl.
CPC .......... *G06F 17/212* (2013.01); *G06F 17/217* (2013.01); *G06F 3/04845* (2013.01); *G06F 17/245* (2013.01); *G06T 11/206* (2013.01); *G06T 2200/24* (2013.01)

(58) Field of Classification Search
CPC .... G06F 17/212; G06F 17/217; G06F 17/245; G06F 3/04845; G06T 11/206; G06T 2200/24
USPC ................................ 715/246, 247, 252, 253
See application file for complete search history.

(56) References Cited

U.S. PATENT DOCUMENTS

| | | | | |
|---|---|---|---|---|
| 6,826,727 B1* | 11/2004 | Mohr | ................... | G06F 17/211 |
| | | | | 382/180 |
| 7,634,725 B2* | 12/2009 | Nishikawa | ............ | G06K 15/02 |
| | | | | 715/243 |
| 7,665,018 B2* | 2/2010 | Honda | .................. | G06F 17/211 |
| | | | | 715/274 |
| 7,735,004 B2* | 6/2010 | Kobashi | ................ | G06F 17/211 |
| | | | | 715/201 |
| 7,847,971 B2* | 12/2010 | Kobashi | ................ | G06F 17/248 |
| | | | | 358/1.18 |
| 7,853,872 B2* | 12/2010 | Ota | ........................ | G06F 17/217 |
| | | | | 715/209 |
| 8,023,738 B1* | 9/2011 | Goodwin | ........... | G06K 9/00469 |
| | | | | 382/175 |
| 8,032,824 B2* | 10/2011 | Croft | ................... | G06F 17/2211 |
| | | | | 715/229 |
| 8,086,958 B2* | 12/2011 | Tokunaga | ............. | G06F 17/211 |
| | | | | 715/205 |
| 8,134,575 B2* | 3/2012 | Wong | ..................... | G06T 11/60 |
| | | | | 345/619 |

(Continued)

*Primary Examiner* — Andrew R Dyer
(74) *Attorney, Agent, or Firm* — Keller Jolley Preece

(57) ABSTRACT

Embodiments of the present disclosure relate to a document layout system that automatically optimizes dynamic documents (i.e., documents having dynamic content). In particular, the document layout system intelligently populates and arranges content items, including dynamic content items, into a dynamic document. Further, upon receiving dynamic content updates that change the dimensions (e.g., expand or shrink) of one or more dynamic content items within a dynamic document, the document layout system automatically modifies the arrangement of the content items to resolve any position conflicts detected between content items within the dynamic document. Further, the document layout system provides a number of features that assist users in organizing and arranging dynamic documents.

20 Claims, 21 Drawing Sheets

(56) References Cited

U.S. PATENT DOCUMENTS

| | | | | |
|---|---|---|---|---|
| 8,145,995 B2* | 3/2012 | Rohrabaugh | G06F 17/30905 | 715/249 |
| 8,375,298 B2* | 2/2013 | Ishiguro | H04N 1/3873 | 358/1.18 |
| 8,381,099 B2* | 2/2013 | Giannetti | G06F 17/248 | 715/234 |
| 8,402,381 B2* | 3/2013 | Berg | G06F 3/0481 | 382/162 |
| 8,578,269 B2* | 11/2013 | Osaka | G06F 17/211 | 358/1.18 |
| 8,676,886 B2* | 3/2014 | Melet | G06F 17/30899 | 709/203 |
| 8,839,095 B2* | 9/2014 | Kelley | G06F 17/211 | 715/243 |
| 8,943,399 B1* | 1/2015 | Pereira | G06F 17/2241 | 715/204 |
| 8,972,853 B2* | 3/2015 | William | G06F 17/211 | 715/243 |
| 9,183,006 B2* | 11/2015 | Turcotte | G06F 9/4443 | |
| 9,223,761 B2* | 12/2015 | Sukhanov | G06F 17/212 | |
| 9,268,761 B2* | 2/2016 | Baldwin | G06F 17/248 | |
| 9,304,975 B2* | 4/2016 | Boreham | G06F 17/211 | |
| 2005/0168780 A1* | 8/2005 | Kobashi | G06F 17/248 | 358/1.18 |
| 2006/0277206 A1* | 12/2006 | Bailey | G06F 11/328 | |
| 2007/0126793 A1* | 6/2007 | Yamakado | G06F 17/212 | 347/43 |
| 2008/0189603 A1* | 8/2008 | Kikuchi | G06F 17/248 | 715/243 |
| 2009/0109480 A1* | 4/2009 | Osaka | G06F 17/211 | 358/1.15 |
| 2010/0302592 A1* | 12/2010 | Nishikawa | G06F 3/1211 | 358/1.16 |
| 2010/0332454 A1* | 12/2010 | Prahlad | G06F 17/30082 | 707/654 |
| 2010/0332973 A1* | 12/2010 | Kloiber | G06F 17/30011 | 715/255 |
| 2011/0276868 A1* | 11/2011 | Hoke | G06F 17/211 | 715/217 |
| 2012/0221933 A1* | 8/2012 | Heiney | G06F 17/30011 | 715/212 |
| 2012/0278691 A1* | 11/2012 | Heiney | G06F 17/21 | 715/202 |
| 2013/0185624 A1* | 7/2013 | Appleyard | G06Q 10/10 | 715/234 |
| 2015/0161271 A1* | 6/2015 | Gur | G06F 17/3087 | 707/728 |
| 2015/0277722 A1* | 10/2015 | Masterson | G06F 3/04847 | 715/752 |
| 2015/0324340 A1* | 11/2015 | Tsui | G06F 17/28 | 715/255 |
| 2016/0342574 A1* | 11/2016 | Zhang | G06F 17/22 | |

* cited by examiner

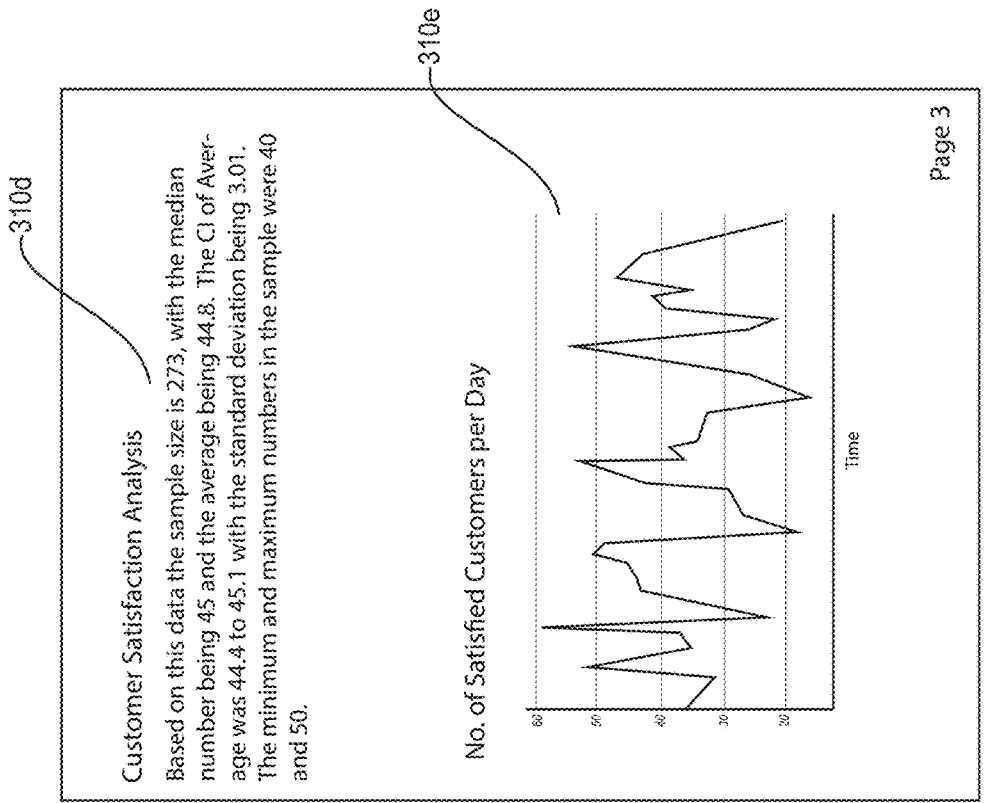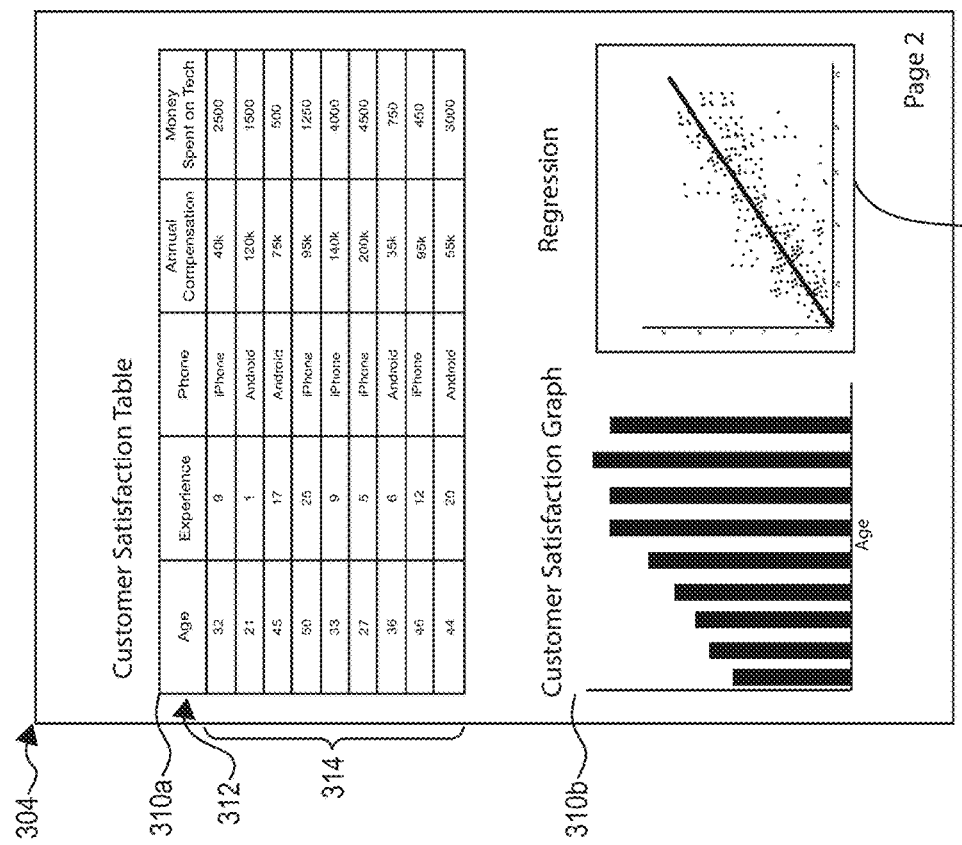
Fig. 3A

Fig. 3B

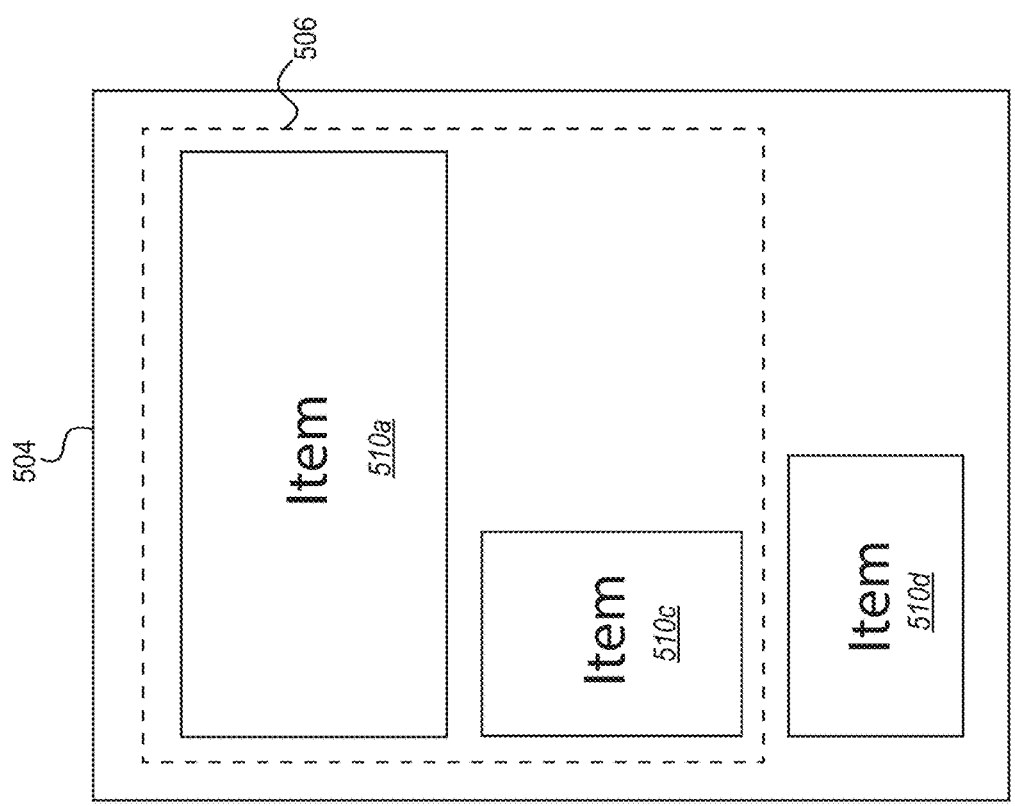
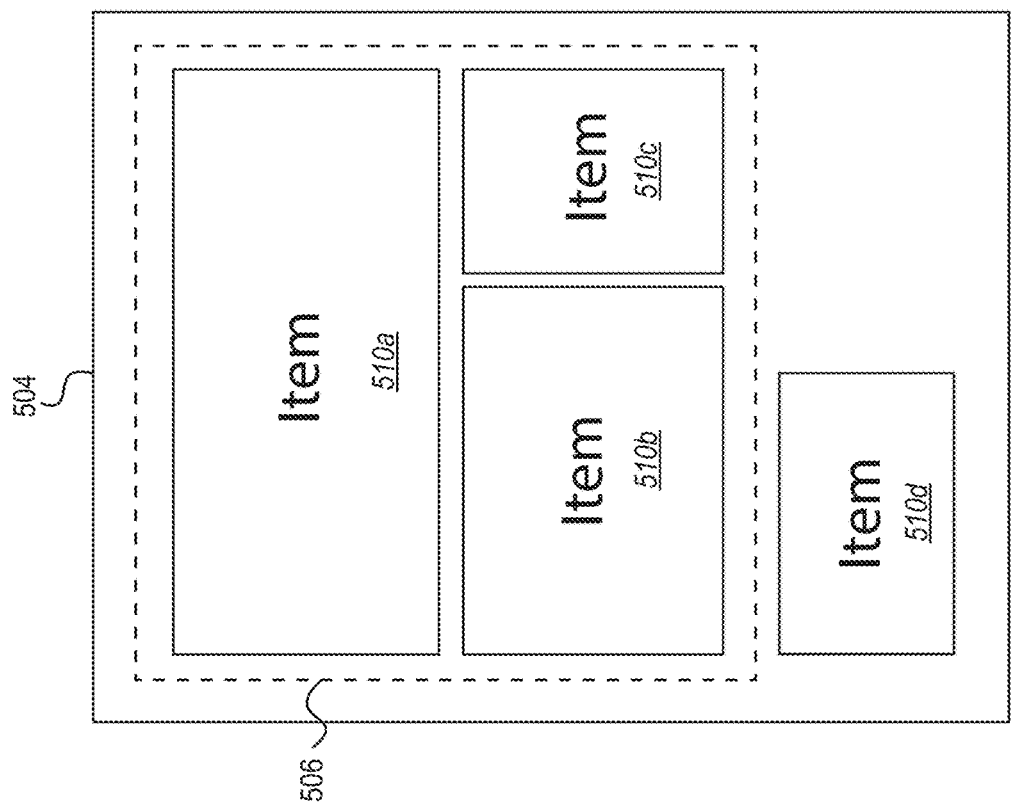

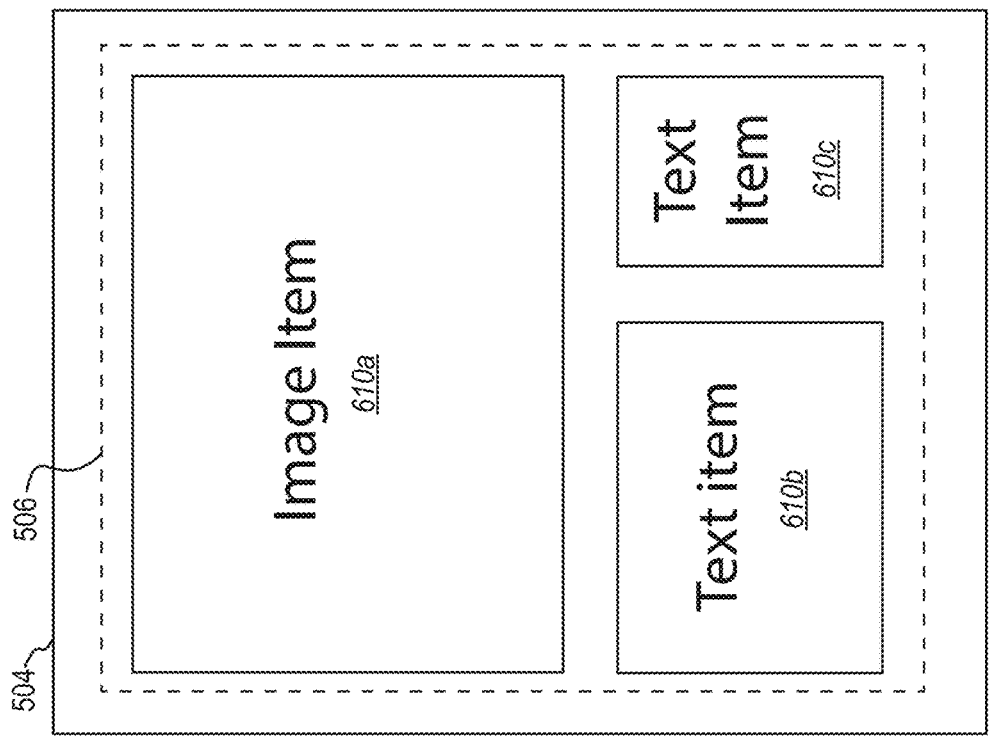
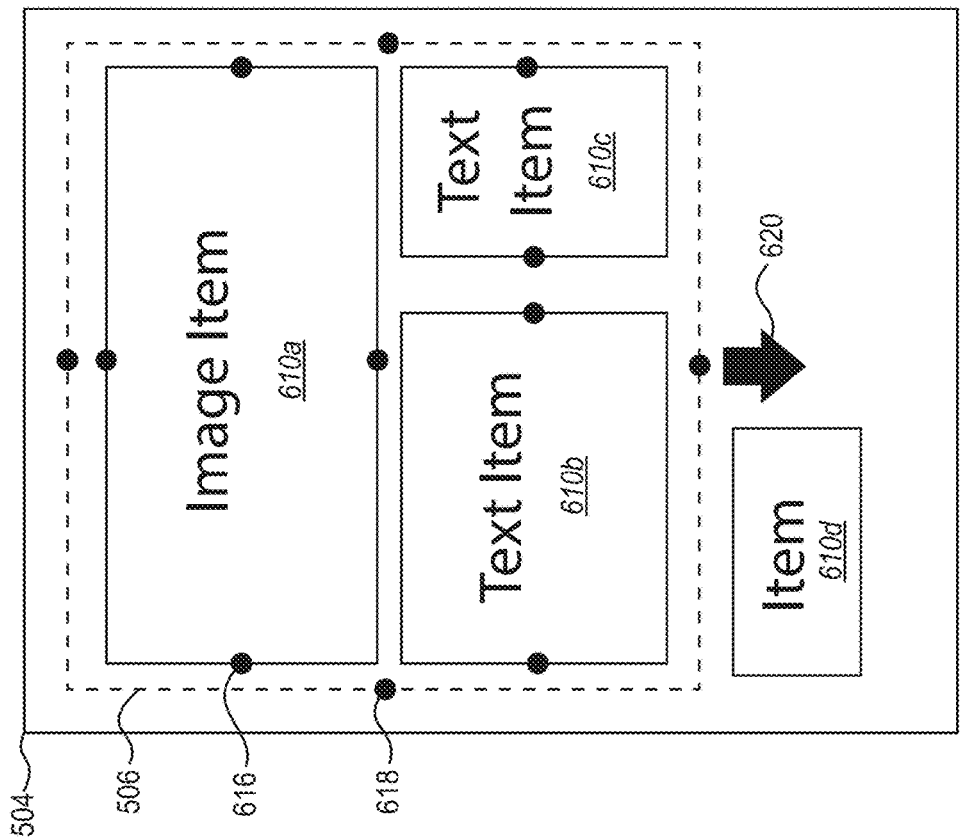
Fig. 6B
Fig. 6A

OPTIMIZING A DOCUMENT BASED ON DYNAMICALLY UPDATING CONTENT

BACKGROUND

The advent of document designs systems has increased productivity with respect to document creation and processing. For example, many conventional document design systems provide tools that enable individuals to create, edit, format, paginate, store, and share both physical and digital documents. Indeed, many conventional document design systems populate documents from import data obtained from outside sources. While conventional document design systems may provide increased productivity, there remain a number of drawbacks with conventional document design systems.

Generally, conventional document design systems are divided into two groups, text-based systems and free-form based systems. Text-based document design systems, such as a word-processing system, enable individuals to enter and edit large bodies of text. As text is entered, text-based document design systems enable text to flow continuously, automatically breaking at each page. Text-based document design systems, however, perform poorly with non-text input, such as data visualizations (e.g., charts, graphs, and images). For instance, text-based document design systems often apply text-based rules to data visualizations, which creates undesirable effects, such as moving data visualizations to unwanted locations within a document, overlapping data visualizations with and text/other data visualizations, and/or creating large unused space. Because many dynamic documents (e.g., auto-populated documents and document reports) are increasingly using more data visualizations, text-based document design systems are ill-suited for these types of documents.

Free-form document design systems enable individuals to manually position objects at select locations within a document as well as enable individuals to manually resize objects. As such, free-form document design systems are better suited to handle data visualizations. Free-form document design systems, however, require that objects be confined either to a single page or to a defined size of a particular data visualization. In other words, free-form document design systems do not allow for objects, such as data visualizations, to expand, resize, span multiple pages or other formatting issues based on a change in data associated with a data visualization. Rather, an individual must manually reduce the size of an object to fit on a single page. Alternatively, an individual using a free-form design system must manually cut a larger object into multiple pieces and place each piece on a separate page of the document.

These and other problems are compounded with the introduction of dynamic data visualizations, or data visualizations associated with data that automatically updates over time. In particular, as data associated with a data visualization updates, conventional document design systems, including text-based systems and free-form systems, are often ill-equipped to appropriately visualize the updated data within a well-designed and organized document. Due to the drawbacks described above, each time a data visualization changes size in a document, an individual often has to manually update the paginated report to fix undesirable effects, such as overlapping objects or large unused spaces in the document.

As explained above, conventional document design systems lack the sophistication and computer intelligence to automatically update and create a document design. Thus, conventional systems rely on manual editing of documents each time data associated with the documents changes. Because in some instances data is updated in real-time, computer generated documents often require significant time in manually updating the documents, reposting of documents, presenting of documents, and other manual tasks associated with data visualizations that dynamically update.

Accordingly, there are a number of considerations to be made in generating, updating, and optimizing documents and document designs and formatting associated with dynamic data visualizations.

SUMMARY

One or more embodiments disclosed herein provide benefits and/or solve one or more of the previous or other problems in the art, with systems, computer-readable media, and methods that automatically optimize a dynamic document (i.e., a document having dynamic content). In particular, the disclosed systems and methods intelligently populate and arrange content items, including dynamic content items, into a document. Further, upon receiving dynamic content updates that change the dimensions, the systems and methods can reformat (modify the size, shape, etc.) one or more dynamic content items within the document as well as modify the arrangement of the content items to resolve any position conflicts of content items within the document.

To illustrate, in one or more embodiments, the systems and methods generate a dynamic document by creating an arrangement of content items. At least one of the content items in the arrangement is a dynamic content item, meaning that content within the dynamic content item changes over time as data associated with the dynamic content item updates. For example, upon receiving updated dynamic content for the dynamic content item, the systems and methods update the dimensions of the dynamic content item to display the updated dynamic content within the document. However, based on updating the dimensions of the dynamic content item, the systems and methods detect a position conflict between the updated dynamic content item and another content item in the document. As such, the systems and methods modify the arrangement, size, shape, or other attributes of the content items within the document to resolve any position conflicts, and to optimize a design layout of the document.

Additional features and advantages of exemplary embodiments are outlined in the following description, and in part will be obvious from the description or may be learned by the practice of such exemplary embodiments. The features and advantages of such embodiments may be realized and obtained using the instruments and combinations particularly pointed out in the claims. These and other features will become more fully apparent from the following description and claims or may be learned by the practice of the example embodiments provided in the following description.

BRIEF DESCRIPTION OF THE DRAWINGS

To better describe the manner in which the systems and methods obtain the advantages and features of the disclosed embodiments, a number of example embodiments are described in connection with accompanying drawings. It should be noted that the drawings may not be drawn to scale. Further, for illustrative and explanation purposes, elements of similar structure or function are commonly represented by like reference numerals throughout the figures.

FIGS. 3A-3C illustrate an example dynamic document that changes arrangement in response to receiving updated dynamic content in accordance with one or more embodiments described herein.

FIGS. 5A-5B illustrate an example dynamic document having an arrangement that includes a group of content items in accordance with one or more embodiments described herein.

FIGS. 6A-6C illustrate resizing a group of content items within a dynamic document in accordance with one or more embodiments described herein.

DETAILED DESCRIPTION

Figure 1:
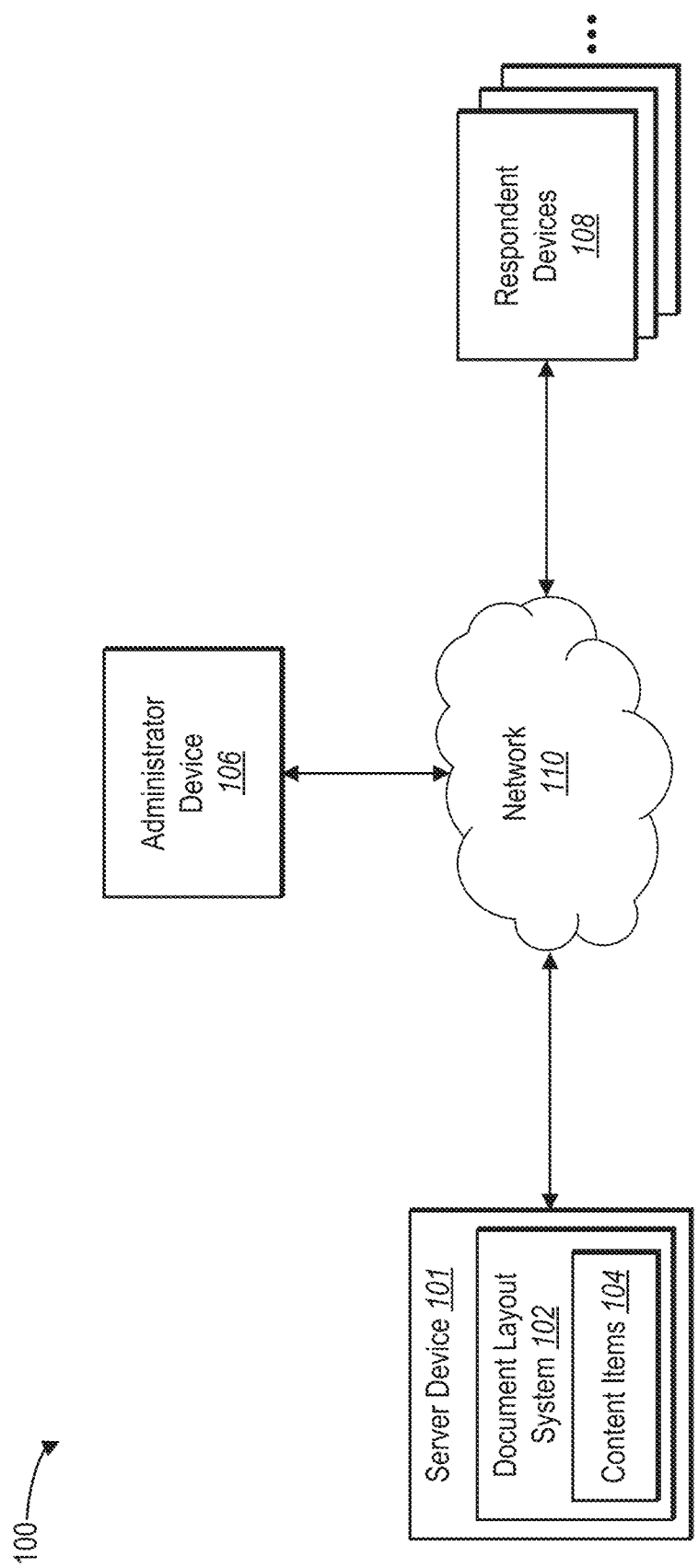
FIG. 1 illustrates an example embodiment of a communication environment in accordance with one or more embodiments described herein.

One or more embodiments disclosed herein provide a document layout system that automatically optimizes dynamic documents (i.e., documents having dynamic content). In particular, the document layout system intelligently populates and arranges content items, including dynamic content items, into a dynamic document. Further, upon receiving dynamic content updates associated with one or more dynamic content items within the dynamic document, the document layout system automatically modifies the size, shape, position, arrangement, layout, and/or other formatting attributes of the content items. In particular, in response to detecting an update to data associated within a dynamic content item, the document layout system can detect and resolve any position conflicts detected between content items within the dynamic document by moving, resizing, reshaping, and/or repositioning one or more content items within the dynamic document.

One or more embodiments disclosed herein provide a document layout system that improves the organization and arrangement of dynamic documents. The document layout system detects and resolves position conflicts that often occur in dynamic documents. For example, when a dynamic document includes one or more dynamic content items, the size and shape of the dynamic content item often change as data associated with the dynamic content item updates. Changes in the size and shape of a dynamic content item can then lead to position conflicts, such as the dynamic content item expanding to overlap or interfere with another content item within the dynamic document.

As mentioned above, the document layout system detects position conflicts and modifies the formatting and arrangement of content items within a dynamic document to resolve position conflicts detected between content items. As one example, when the document layout system detects that a dynamic content item expands to touch (e.g., overlap with) another content item, the document layout system can shift the other content item away from the expanded dynamic content item. As another example, when the document layout system detects that a dynamic content item has reduced in size, the document layout system can float the other content item up to be closer, and in some cases alongside, the dynamic content item.

In some example embodiments, the document layout system intelligently adjusts the arrangement of a dynamic document in response to user input. In other words, just as the document layout system can automatically adjust the arrangement in response to updated data associated with a dynamic content item, the document layout system can also adjust the arrangement based on user input changing the one or more attributes (e.g., size) of content items within the dynamic document. For example, the document layout system receives user input that causes the document layout system to resize the height and/or width of a content item in a dynamic document. After executing the user input, the document layout system detects if any position conflicts exist, and if so, automatically resolves the position conflict without additional user action, as described above.

In addition, in some example embodiments, the document layout system intelligently arranges content items in a dynamic document based on content item types. For example, the document layout system treats text-based content items differently than image-based content items. In particular, in one or more embodiments, the document layout system enables text-based content items to break across pages of a dynamic document. Furthermore, for example, the document layout system enables users to adjust the width of the text-based content item, while the height is based on the content within the text-based content item. In addition, in some embodiments, the document layout system enables users to modify both the height and width of image-based content items, but the document layout system prevents image-based content items from spanning across pages of a dynamic document, and thus resizes or repositions dynamic content items based on these or other example content item types.

As part of creating an arrangement for a dynamic document, in one or more embodiments, the document layout system provides page delineators that separate content items within a multi-page dynamic document. For example, the document layout system automatically inserts or enables a user to add one or more page delineators. The document layout system separates content items on different pages of the dynamic document that are divided by a page delineator. In this manner, even after the document layout system modifies the arrangement of the dynamic document (e.g., based on receiving updated dynamic content or user input), the document layout system preserves the paginated division of content items indicated by the page delineator.

In addition to page delineators, in some embodiments, the document layout system provides content item groups. For example, content item groups enable the document layout system to cluster multiple content items together. The document layout system can ensure that content items within a group remain together and/or in the same arrangement, even as the formatting and arrangement of other content items within the dynamic document change to resolve position conflicts. In addition, content items in a group can share common attributes. For example, upon receiving user input for a group, the document layout system equally (e.g., proportionally) applies the input to each content item in the group.

In some example embodiments, a dynamic document includes a fixed or stamped content item. A fix content item includes a content item whose position or arrangement is fixed within a dynamic document. As such, as the document layout system modifies the arrangement of content items within a dynamic document. For example, to resolve a position conflict, the document layout system maintains the current arrangement of the fixed content item. In some cases, the fixed content item causes other content items to jump below the fixed content item to resolve a position conflict. For instance, if a dynamic content item expands into a fixed content item, the document layout system moves the dynamic content item, rather than the fixed content item, to resolve the position conflict.

While the document layout system automatically arranges content items in a dynamic document, in one or more embodiments, the document layout system enables users to customize the arrangement of the dynamic document. For example, a user can provide input rearranging the position of content items within the dynamic document. In many instances, the document layout system can determine a user's intent with respect to the arrangement of content items based on receiving partial or incomplete user input.

As mentioned above, the document layout system creates and modifies arrangements of content items in a dynamic document. In one or more embodiments, the document layout system employs a content item list to arrange (e.g., position and re-position) content items within the dynamic document. Further, the document layout system can use the content item list to detect position conflicts in the dynamic document based on user input and/or updates to dynamic content items. Additional detail regarding employing the content item list and other embodiments will be discussed in detail below with regard to the figures.

The document layout system disclosed herein provides a number of advantages and benefits over conventional document design systems. As one example, the document layout system arranges content items such that the full content of each content item is displayed to a user. In particular, dynamic content within a dynamic content item is not cut off or overlapping other content items.

As another example, the document layout system automatically adjusts the arrangement of one or more content item to resolve position conflicts. For example, when a user provides user input that creates a position conflict, or when a dynamic content item updates in a dynamic document and creates a position conflict, the document layout system intelligently and automatically modifies the arrangement of content items to resolve any position conflicts. Additional detail regarding detecting and resolving position conflicts within a dynamic document is provided below.

In one or more embodiments, the document layout system improves the functionality of one or more computing devices. For example, the document layout system reduces the processing required to optimally arrange and modify content items within a dynamic document. In addition, the document layout system reduces the number of instructions required to detect and resolve position conflicts with a dynamic document. Moreover, the dynamic document system streamlines and optimizes a previously manual computer process of updating dynamic documents by providing a system that automatically and efficiently updates dynamic documents without the need for a user to manually format and arrange dynamic content items within a dynamic document.

Further, many conventional document design systems employ a grid composed of a two-dimensional array that requires each cell in the grid to hold a reference to one or more objects or elements associated with the cell. These conventional systems are memory intensive, particularly when moving content items within a dynamic document. Further, because of the memory requirements, the number of arrays in the grid is limited. In contrast, the document layout system uses small amounts of memory that enable the document layout system to easily and quickly move content items within a dynamic document when creating and modifying arrangements. Also, the document layout system can create dynamic documents of near-infinite size without burdening computing devices.

Additional information on the content management system is presented below in connection with the figures. To illustrate, FIG. 1 shows a schematic diagram of an example communication system 100. As illustrated, the communication system 100 includes a server device 101 that hosts a document layout system 102 having content items 104, an administrator device 106 (associated with an administrator), and respondent devices 108 (associated with corresponding respondents), each device connected via a network 110. Additional details regarding the various devices and networks are explained below with respect to FIGS. 11 and 12.

As mentioned above, the document layout system 102 optimizes dynamic documents having dynamic content. Specifically, the document layout system 102 arranges content items 104 into a dynamic document in an organized and efficient manner. For example, in one or more embodiments, the document layout system 102 generates a dynamic document having an intelligent arrangement of the content items 104, where at least one of the content items 104 is a dynamic content item or a content item having dynamic content (e.g., a data visualization associated with updatable data). The document layout system 102 can generate an arrangement for a single page dynamic document or a multi-page dynamic document.

When the document layout system 102 receives updated content for the dynamic content item that creates a position conflict in the dynamic document, the document layout system 102 modifies the arrangement of content items 104 to resolve the position conflict. In particular, the document layout system 102 receives updated content for the dynamic content item and updates the dynamic content item within the dynamic document. Often, updating the dynamic content item creates a position conflict in the arrangement. In some instances, updating the dynamic content item causes the dynamic content item to expand, which causes the dynamic content item to overlap with or touch other content items and obstruct content and diminish the aesthetic of the document. Alternatively, in other instances, updating the dynamic content item causes the dynamic content item to reduce in size, which causes the dynamic content item to move farther away from other content items creating excess unused space in the dynamic document. In either case, when a dynamic content item changes size, the arrangement is no longer optimized. As such, the document layout system 102 modifies the arrangement to again achieve an optimal arrangement.

By continually optimizing the arrangement of content items 104 within a dynamic document as dynamic content is updated, the document layout system 102 can ensure that users are presented with an optimized dynamic document. In this manner, each time a user, such as an administrator, accesses the dynamic document, the user is provided with an optimally arranged dynamic document that includes the most current data within data visualizations in the dynamic document. Further, the user need not manually correct conflicts where content items are overlapping or improperly spaced, as is required with conventional document design systems.

Although FIG. 1 illustrates a particular arrangement of the document layout system 102, the administrator device 106, the respondent devices 108, and the network 110, various additional arrangements are possible. For example, the administrator device 106 directly communicates with the server device 101 hosting the document layout system 102, bypassing the network 110. Further, while only one administrator device 106 and a group of respondent devices 108 are illustrated, the communication system 100 can include any number of administrator devices.

As used herein, the term "dynamic document" refers to an electronic document that includes content items. The term "content item," as used herein generally refers to any data or information (i.e., content) that a computing device can present to a user. Examples of a content item can include text-based content items (e.g., text blocks, titles, tables, etc.) and image-based content item (e.g., charts, graphs, graphics, pictures, digital images, maps, gifs, movies, etc.) Additional examples of content items include digital media, audio/music files, location information, notifications, advertisements, and/or search results. A content item can be included within a group of content items. A group of content items does not necessarily include the same or similar content items. For example, a group of content items can include a plurality of several different types of content items.

Furthermore, for purposes of describing one or more embodiments disclosed herein, reference is occasionally made to content items representing data from survey responses. For example, upon analyzing one or more survey responses, the document layout system 102 generates content for one or more content items and arranges a document report (i.e., a dynamic document) based on the generated content items. Moreover, as additional responses are received and analyzed, the document layout system can also update the content in the content item (e.g., a dynamic content item), which leads to the document layout system automatically modifying the arrangement of the document report. One will appreciate that when reference is made to survey-related content items and document reports, the same principles and concepts can be applied to other types of content items and dynamic documents.

Turning now to FIGS. 2A-2E, an example of a dynamic document is provided. In particular, FIGS. 2A-2E illustrate multiple views of a graphical user interface 202 that displays a dynamic document 204 having dynamic content items. In particular, a computing device 200 displays the graphical user interface 202. In one or more embodiments, the computing device 200 represents the administrator device described above. In other words, in these embodiments, an administrator user views the dynamic document 204 via the computing device 200.

In general, the document layout system described above provides the graphical user interface 202 to the computing device 200 for display to a user. More specifically, the document layout system generates the dynamic document 204 and provides the dynamic document 204 to the user via the computing device 200. Accordingly, the document layout system described with respect to FIGS. 2A-2E can be an example embodiment of the document layout system 102 described above with respect to FIG. 1.

As mentioned above, the graphical user interface 202 displays a dynamic document 204 generated by the document layout system. As illustrated, the document layout system generates an arrangement of a first content item 210a, a second content item 210b, and a third content item 210c (collectively referred to as "content items 210"). For purposes of explanation, the content items 210 represent results from a collection of survey responses. For instance, the document layout system receives and analyzes survey responses regarding customer satisfaction to obtain the content included in the content items 210.

As further illustrated, each of the content items 210 includes a content item title 212. In one or more embodiments, however, one or more content items 210 in the dynamic document 204 do not include a content item title. In some embodiments, the content item title 212 is a separate content item from the content item that it describes. In other embodiments, content item title 212 is a caption positioned below an accompanying content item.

Figure 3B:
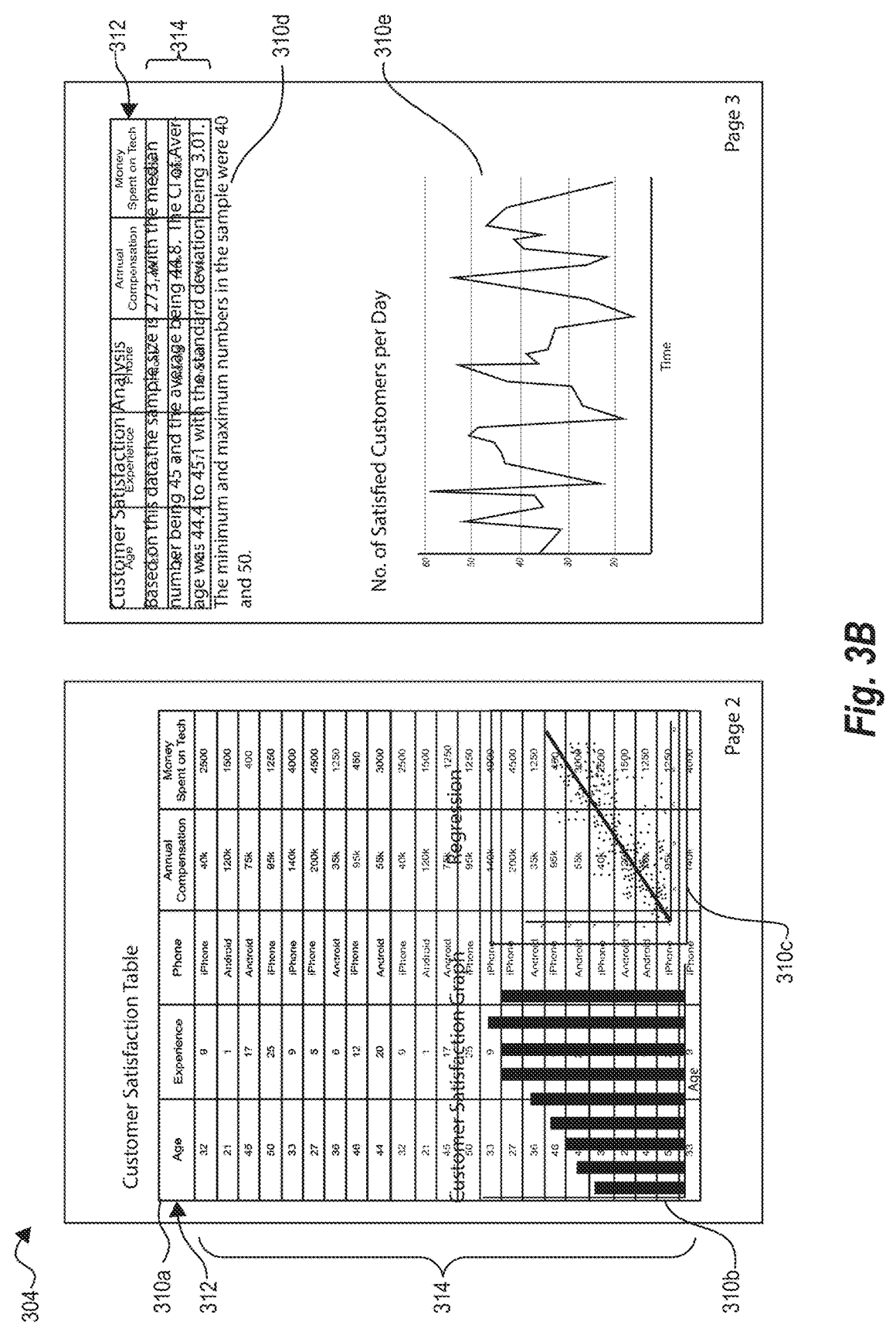
Figure 3C:
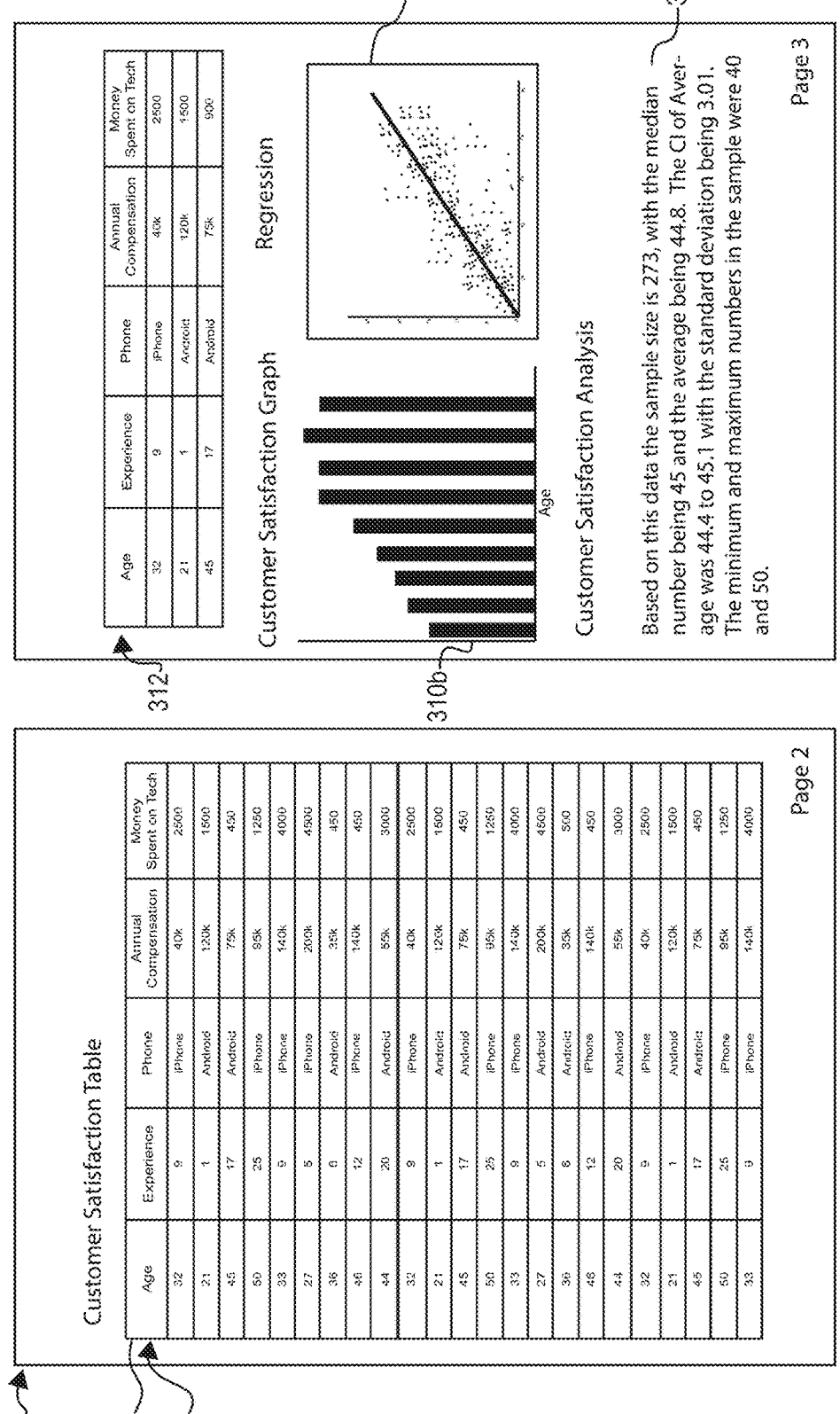

One or more of the content items 210 can include a dynamic content item. For example, each of the content items 210 shown in the dynamic document 204 are dynamic content items that change content as the document layout system receives and analyzes additional survey responses. FIGS. 3A-3C below provide an example of a dynamic content item changing dimensions in response to receiving updated content. In another embodiment, such as when the user adds a content item from an outside source, the content item is not dynamic, and thus, does not automatically update.

As part of generating an arrangement for the dynamic document 204, in one or more embodiments, the document layout system tests various arrangements and sizes for the content items 210 to identify an optimal arrangement. In general, the document layout system selects the size of a content item based on the type of content and the amount of content within the content item. For instance, the document layout system determines that a content item that includes only text can vary in width while a content item that includes an image should be sized proportionally with the native dimensions of the image. Additional description regarding content item types and determining the size of content items is provided below with respect to FIGS. 2B and 2C.

Further, when arranging content items in a dynamic document, in one or more embodiments, the document layout system can employ a content item padding that creates a perceived buffer distance between each content item. In some embodiments, the padding can vary from one content item to the next. Furthermore, in one or more embodiments the padding is defined by a margin between a content item with respect to the grid. In addition, the document layout system arranges the content items within margins of the dynamic document. The document layout system can employ standard or variable page margins in a dynamic document. Furthermore, the document layout system can apply padding distances and/or margins defined by a user (e.g., the user selects a dynamic document template having a defined buffer or padding distance between content items and page margins).

Figure 2A:
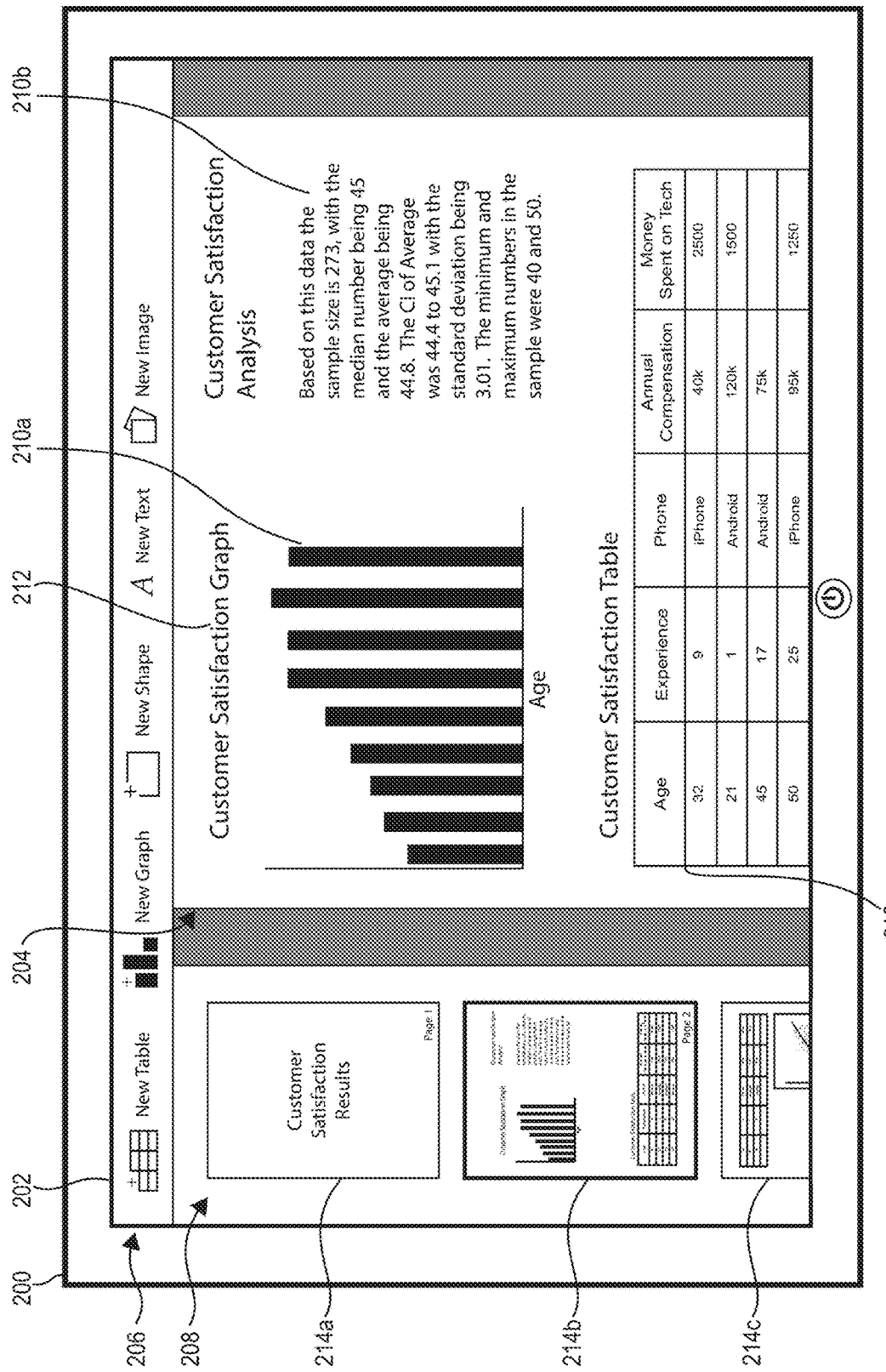
FIGS. 2A-2E illustrate example views of a graphical user interface displaying a dynamic document in accordance with one or more embodiments described herein.

As recently mentioned above, the content items 210 are arranged in a particular arrangement within the dynamic document 204. For example, the document layout system automatically generates the arrangement of the content items 210, as shown in FIG. 2A. Further, as described below in connection with FIGS. 3A-3C, the document layout system can detect and resolve position conflicts as a result of a dynamic content item updating and changing dimensions. In addition to automatically generating the arrangement of the content items 210, a user (e.g., an administrator) provides input regarding the arrangement of the content items 210. Additional detail regarding customizing an arrangement of a dynamic document based on user input is provided below with respect to FIG. 2B.

In addition to displaying the dynamic document 204, the graphical user interface 202 includes a toolbar 206 and a document preview panel 208. The toolbar 206 includes a number of selectable options that enable a user to customize the dynamic document 204. For example, the toolbar 206 enables a user to manually add content items of images, text, and/or graphics to the dynamic document 204. The document layout system can provide the toolbar 206 when the user has authorization to modify the dynamic document 204. Alternatively, in some example embodiments, the document layout system provides the dynamic document 204 to a user that is not authorized to make modifications. In these embodiments, the graphical user interface 202 does not include the toolbar 206, or elements within the toolbar 206 are limited to only viewing and navigational elements.

The document preview panel 208 provides a miniaturized (e.g., thumbnail) preview of the dynamic document 204. In this manner, content items included in the dynamic document 204 are also represented in each document page shown in the document preview panel 208. In cases where a dynamic document includes multiple pages, the document preview panel 208 displays multiple page previews of the dynamic document 204, as shown in FIG. 2A. Otherwise the preview panel 208 can display a single document preview page.

The preview panel 208 may include additional document page previews that become visible as a user navigates within the dynamic document 204 or the document preview panel 208, or as a user resizes the document preview panel 208. Further, the document preview panel 208 can also serve as a navigational tool to assist a user in switching between pages of the dynamic document 204. For example, in response to a user selecting a different document page preview in the document preview panel 208, the document layout system updates the dynamic document 204 to display the corresponding document page.

To illustrate, the document preview panel 208 includes a first document page preview 214a, a second document page preview 214b, and a third document page preview 214c. As shown, the second document page preview 214b includes miniature representations of the content items 210 shown in the dynamic document 204. For purposes of explanation, occasional reference will be made to content item representations shown in a document page preview when describing corresponding content items included in a page of the dynamic document 204 not currently shown within the graphical user interface 202. For example, while not shown in the current display of dynamic document 204, the third content item 210c continues to the third page of the dynamic document 204, as shown in the third document page preview 214c.

In addition, while not illustrated, the graphical user interface 202 includes additional user interaction panels. For example, upon detecting a user selecting a content item (e.g., the first content item 210a) a content item tool panel appears to the right (or elsewhere) of the dynamic document 204 (and likewise, are hidden with all content items are deselected). The content item tool panel can include commands particular to the selected content item. For instance, the content item tool panel allows a user to input the source of the content item, specify fields associated with the content item, or remove a selected content item. If the content item is an image content item, the content item tool panel enables the user to specify the span of the image (e.g., fill, stretch, tile, fit, center, etc.) Depending on the selected span, the document layout system truncates the size of the image. If the content item is a table content item, the content item tool panel can include formatting options for portions of text within the table. In some embodiments, the content item tool panel also enables a user to specify the margins on the dynamic document 204 or a selected content item (e.g., padding size around the selected content item).

Figure 2B:
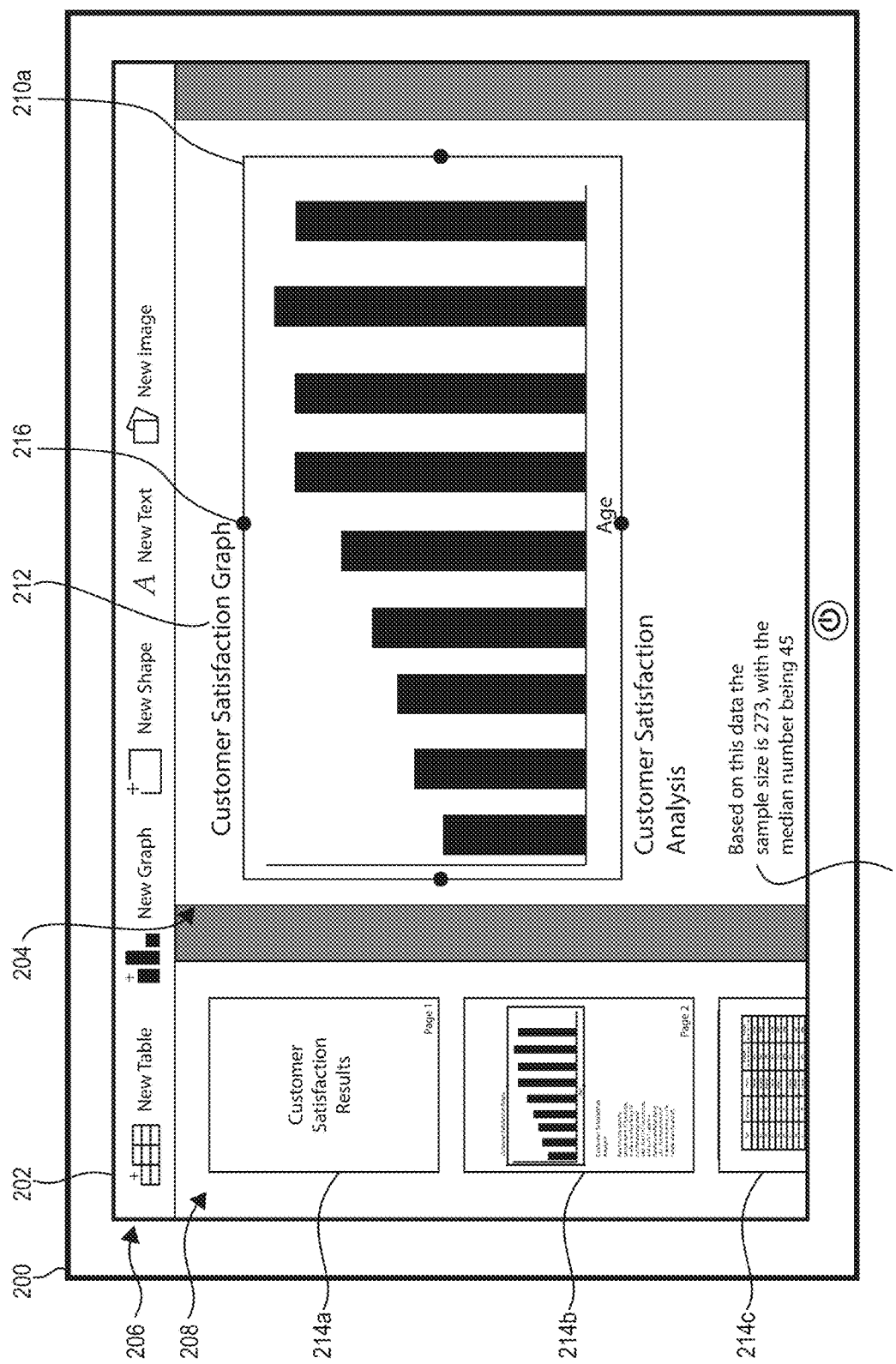

As mentioned above, the document layout system enables a user to edit one or more content items 210 within the dynamic document 204. To illustrate, FIG. 2B shows modifying the first content item 210a based on user input. As shown, the first content item 210a, when selected, includes handles 216 that enable a user to manipulate the size of the content item. In particular, FIG. 2B shows one handle on each edge of the first content item 210a. In some example embodiments, the document layout system additionally, or in the alternative, includes handles on the corners of a content item. Furthermore, while handles 216 are shown in FIG. 2B, in one or more embodiments, the document layout system provides the functionality of the handles without displaying handles that appear as actual graphical elements. For instance, a change as it hovers over the edge of a content item (without visible handles) indicating that the user can edit the size of a content item.

Using one of the handles 216, a user can select and drag a handle to provide input to enlarge or shrink the first content item 210a. For example, based on the user input of moving the handle on the right edge of the first content item 210a, the document layout system horizontally expands the first content item 210a from the size of the first content item 210a shown in FIG. 2A to the size of the first content item 210a shown in FIG. 2B.

As part of expanding the first content item 210a, the first content item 210a initially moves closer to the second content item 210b. For example, the first content item 210a expands to encroach or overlap (e.g., touch) the second content item 210b (not shown because first content item 210a is overlapping the second content item 210b). Either as the first content item 210a is expanding, or after the document layout system has fully expanded the first content item 210a, the document layout system detects that the first content item 210a conflicts with the second content item 210b within the current arrangement. In particular, the document layout system detects that the position of the expanded first content item 210a intersects with the position of the second content item 210b creating a position conflict. Another visual example of a dynamic content item overlapping another content item is shown in FIG. 3B, which is discussed further below.

In response to detecting the position conflict, the document layout system determines which content item to modify or rearrange. The document layout system can determine which content item to modify or reposition based on one or more factors. For example, the document layout system considers content item location (e.g., based on left-to-right, top-to-bottom), priority (e.g., content item list order), user intent (e.g., which content item the user is editing or moving), content item size (e.g., small versus large), content within each content item (e.g., images before text or vice-versa), content item correlation (e.g., the order of the survey question with which the content item is associated), content item type, location of page breaks with respect to content items, and/or content item groupings when determining which content item to move to resolve the position conflict.

As shown in FIG. 2B, the document layout system rearranges the second content item 210b to resolve the position conflict between the first content item 210a and the second content item 210b. In particular, the document layout system moves the second content item 210b below the first content item. Further, as a result of moving the second content item 210b down within the dynamic document 204, the document layout system detects a new position conflict between the second content item 210b and the third content item 210c (shown in FIG. 2A). Accordingly, the document layout system resolves the subsequent position conflict by shifting the third content item 210c down below the second content item 210b, as shown in the third document page preview 214c in FIG. 2B.

As a note, the document layout system detects and resolves position conflicts without a user detecting or manually resolving any position conflicts. For example, as the user is providing input to expand the first content item 210a, the document layout system is detecting the position conflict, determining how to resolve the conflict (e.g., which content item to rearrange), and modifying the arrangement of the determined content item to resolve the position conflict. In some embodiments, modifying the arrangement is nearly in real-time and reacts directly in response to a user modifying a content item. For instance, as the user continually expands a content item, the dynamic document system continually updates the formatting and position of other content items. As a result, the document layout system displays the modified arrangement to the user in real-time in connection with showing the user the expanded first content item 210a that results from the user's input. Further, the document layout system is providing the updated arrangement to the user as the user input is being received, which provides immediate feedback to the user regarding how the user input is affecting the arrangement of a dynamic document In some embodiments, the document layout system provides the preview of the resolved layout to the user in real-time using a representative, simplified, or placeholder content item. For example, as the document layout system is receiving input from a user that modifies the size, shape, or position of a particular content item within the dynamic document 204, the document layout system provides a shadowed box that indicates how the modified content item currently fits into the dynamic document 204. For instance, the document layout system shows that shrinking a content item would enable the currently-modified content item to float up to fit within a container of space, as shown by a shadowed box of the reduced-sized content item fitting in the container of space. Alternatively, in some example embodiments, the document layout system enables the user to view one or more position conflicts and request that the document layout system delay resolving, or not resolve, the position conflict.

Returning to FIG. 2B, in modifying the arrangement to resolve the position conflict between the first content item 210a and the second content item 210b, the document layout system preserves the dimensions (i.e., height and width) of the second content item 210b, as shown. As a result, the second content item 210b flows to the third page in the dynamic document 204. In general, the document layout system preserves the dimensions of content items when modifying the arrangement of a dynamic document. In alternative embodiments, however, the document layout system modifies the dimensions of a content item to better fit within the dynamic document. For example, the document layout system expands the width of the second content item 210b to match that of the first content item 210a. The document layout system can iteratively test various dimensions of various content items to determine the optimal arrangement of content items, such as an arrangement that minimizes the dynamic document's length or avoids content items flowing across pages of the dynamic document.

As mentioned above, a dynamic document can include content items having different types. Primary content item types include text-based content items and image-based content items. Text-based content items primarily include text as content. Examples of text-based content include blocks of text, table data, lists, titles, captions, emoji, etc. Image-based content items include images as content. Examples of image-based content include images, charts, graphs, maps, graphics, gifs, digital photos, etc.

Because of the different types of content stored therein, the document layout system applies different rules and processes to text-based content items than to image-based content items. For example, in one or more embodiments, the document layout system enables text-based content items to flow across pages of a dynamic document while the document layout system prevents image-based content items from spanning across pages of a dynamic document. In alternative embodiments, the document layout system treats all content items equally.

In addition, the document layout system enables users to adjust the height and/or width of an image-based content item, as shown by the handles 216 in FIG. 2A included on both the left and right edges as well as the top and bottom edges. For example, a user can provide input that expands the height, width, or both, of an image-based content item. In some example embodiments, the document layout system limits the proportions (e.g., enforces a minimum aspect ratio) that a user can adjust an image-based content item to prevent the image in the image-based content item from becoming overly skewed.

In contrast to image-based content items, the document layout system enables users to adjust only the height of text-based content items as the document layout system automatically determines the height of text-based content items. In particular, the document layout system automatically determines the height of a text-based content item based on the amount of text included in the text-based content item. In addition, the document layout system selects the height of a text-based content item such that none of the text in the text-based content item is truncated, cut off, or hidden. Accordingly, as a user provides input that expands or shrinks the width of a text-based content item, the document layout system lower or raises, respectively, the height of the text-based content item to ensure all text is within the boundary of the content item.

Figure 2C:
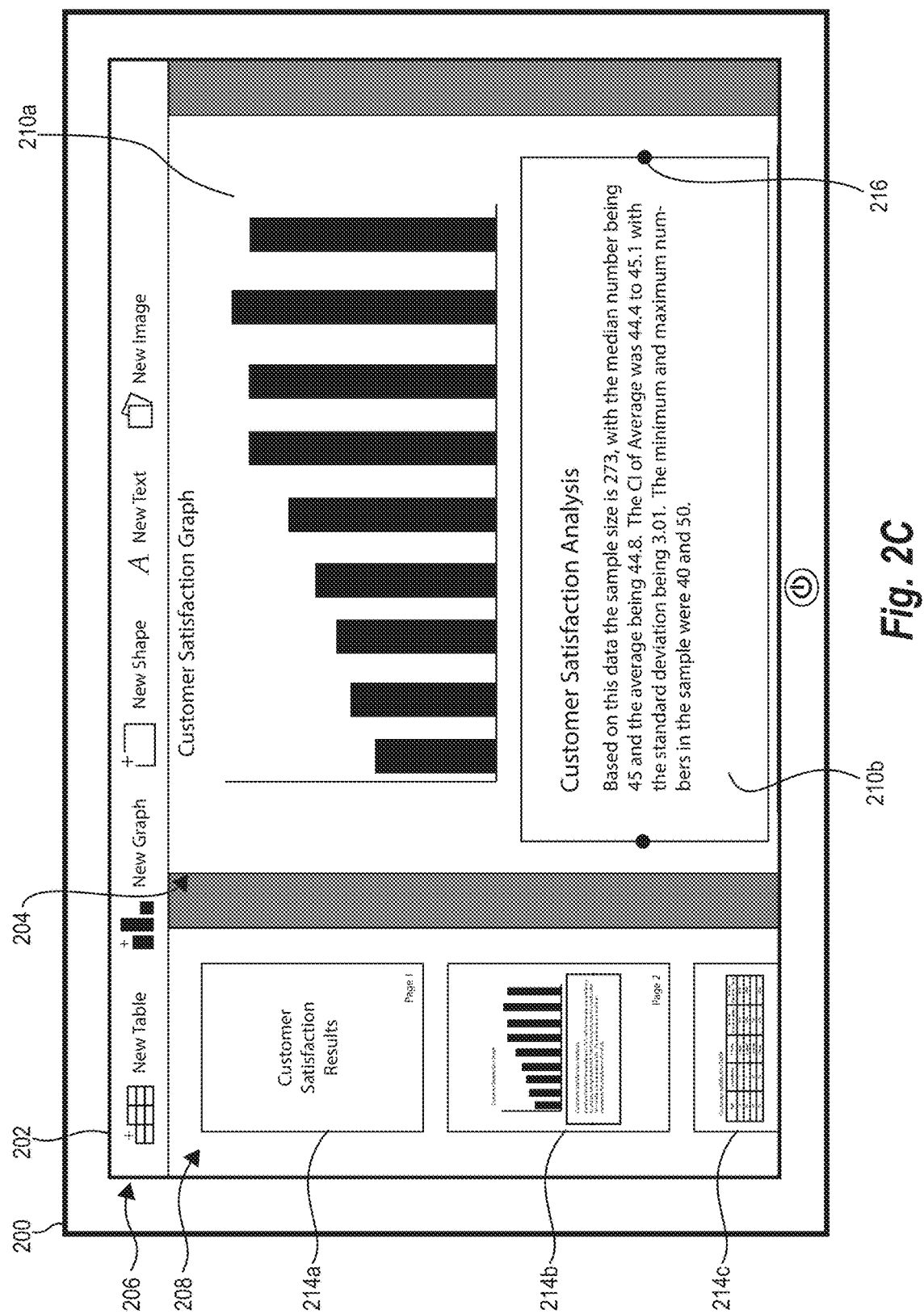

To illustrate, FIG. 2C shows the dynamic document resizing the second content item 210b based on user input. In particular, the second content item 210b in FIG. 2C is a text-based content item that includes text analysis. As such, the document layout system only provides a user with handles 216 on the left and right edges of the second content item 210b. Therefore, as the user expands the width of the second content item 210b, the height of the second content item 210b shrinks as less height is needed to display all of the included text. Likewise, if the user provides input to reduce the width of the second content item 210*b*, the document layout system shrinks the width while increasing the height of the second content item 210*b*, as shown in FIG. 2B.

Figure 2D:
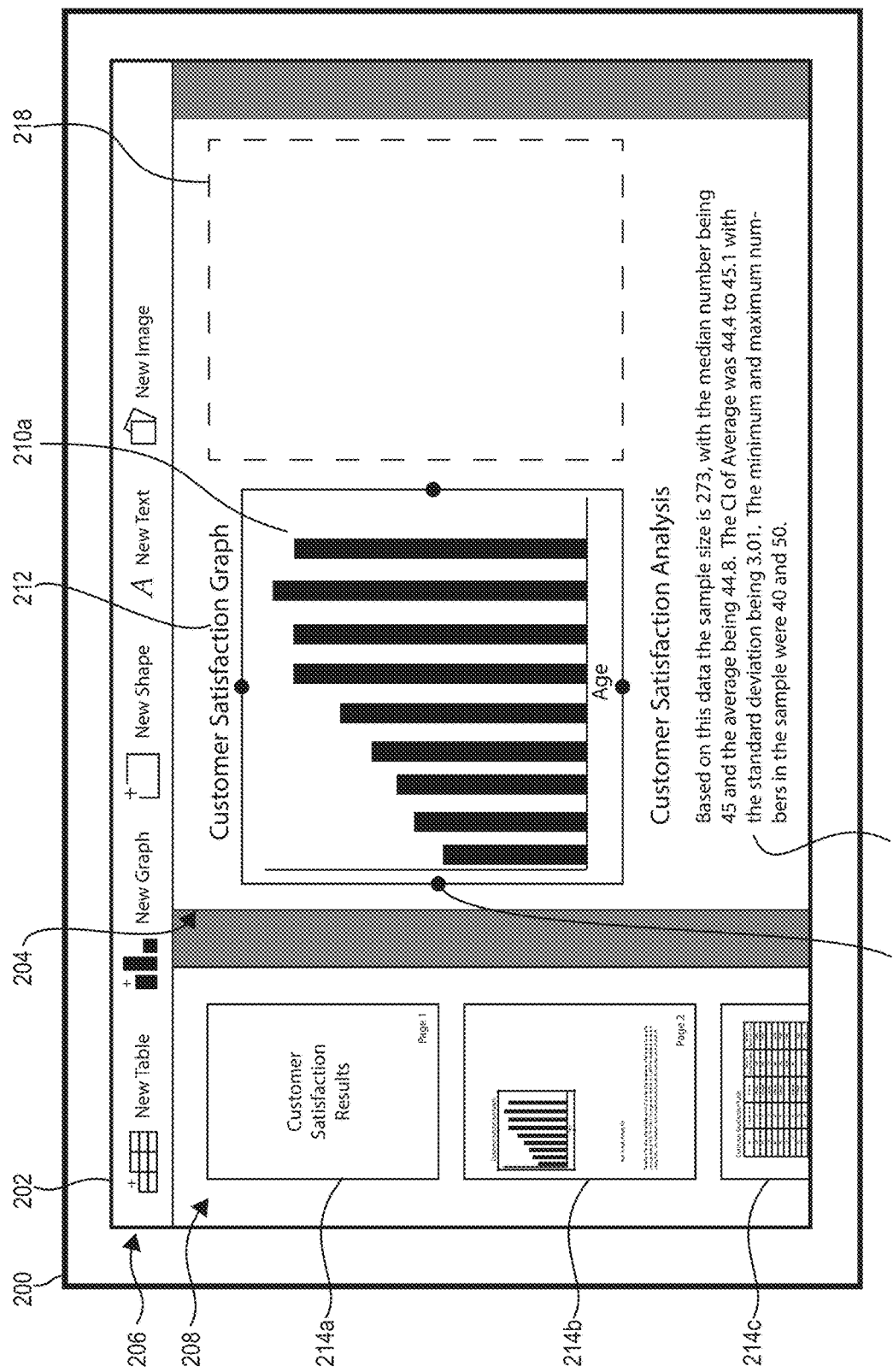

In some example embodiments, the document layout system detects a position conflict based on content items becoming smaller and creating a container of unused space in a dynamic document. To illustrate, FIG. 2D shows the document layout system shrinking the first content item 210*a* (e.g., an image-based content item) based on user input. For example, the user provides input by moving the right handle of the first content item 210*a* from the right margin of the dynamic document 204 toward the center of the dynamic document 204, causing the document layout system to reduce the width of the first content item 210*a*.

Upon shrinking the first content item 210*a*, the arrangement within the dynamic document 204 now includes a void of unused space, called a container 218, alongside to the first content item 210*a*. In one or more embodiments, the document layout system fills the container 218 with another content item in the dynamic document 204. To fill the container 218 of unused space, the document layout system identifies a content item within the dynamic document 204 that properly fits within the container 218. For example, the document layout system systematically checks each subsequent content item to determine if it will fit in the container 218.

To illustrate, the document layout system first determines that the second content item 210*b* (the text labeled as "Customer Satisfaction Analysis") is too wide to fit in the container 218 of unused space. The document layout system next determines that the third content item 210*c* (the table shown in the third document page preview 214*c*) is also too wide to fit in the container 218. As such, the document layout system continues to search for content items that could fit within the contain 218 of unused space alongside the first content item 210*a*.

Figure 2E:
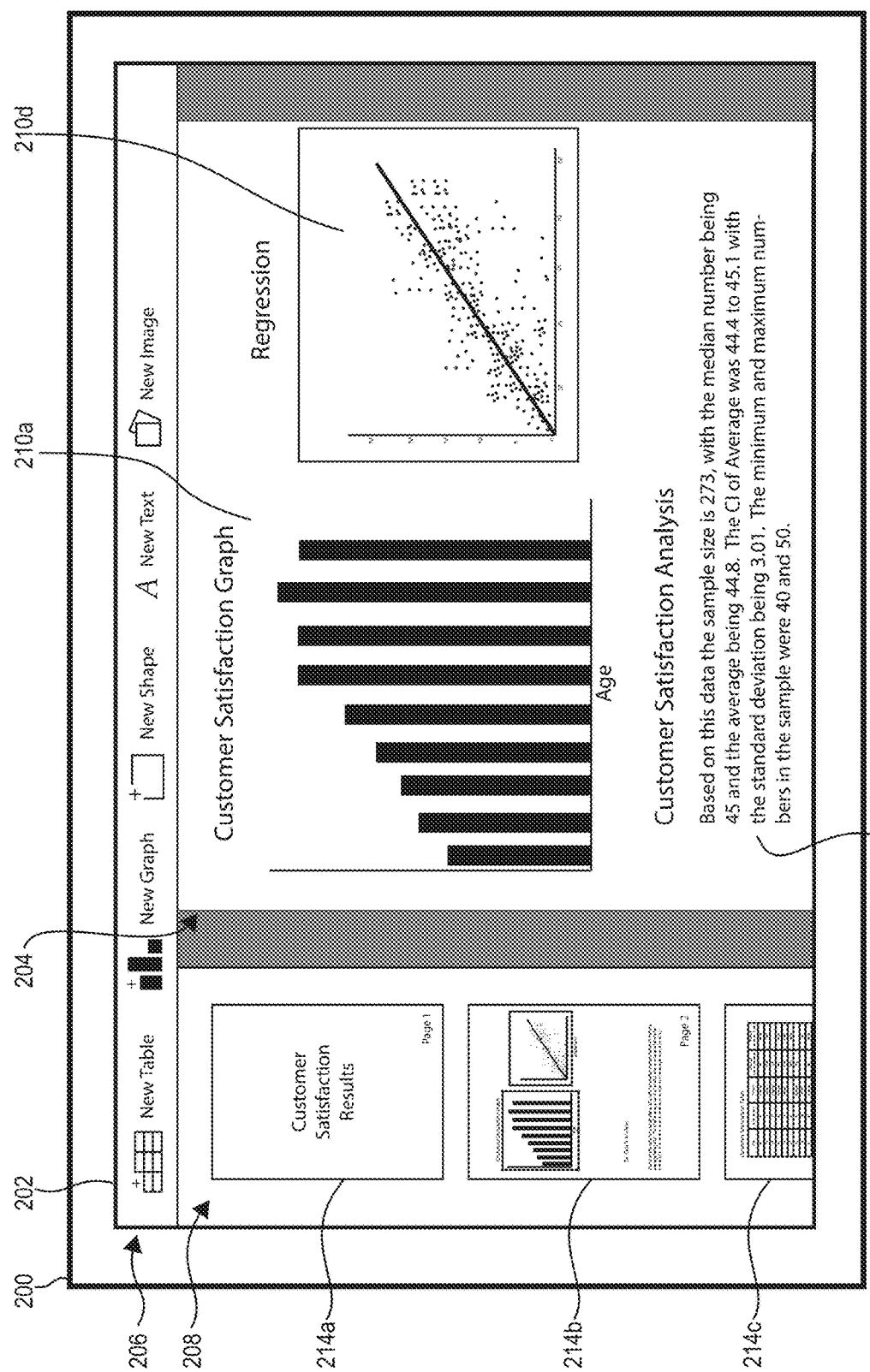

As shown in FIG. 2E, the document layout system identifies a fourth content item 210*d* from the dynamic document 204 to include in the container 218. The fourth content item 210*d* is the correct height and width to fit in the container 218, or can be reformatted to be the correct height and width, or substantially the correct height or width (a height and width that provides an acceptable aesthetic). Accordingly, the document layout system floats the fourth content item 210*d* up from a subsequent page of the dynamic document 204 to page two of the dynamic document 204, as shown. Stated differently, the document layout system modifies the arrangement to reduce unused space where possible. In this manner, the document layout system automatically and optimally arranges content items to maximize the presentation of content items to a user within a dynamic document.

As mentioned above, the document layout system can float up a content item with the dynamic document 204. In one or more embodiments, the document layout system prevents a content item from floating up over a page delineator (e.g., the content item does not cross a page break). For example, if a content item is anchored to a given page or section, the document layout system can float the content item up or push the content item down within the given page or section. In some embodiments, the document layout system floats a content item up by moving the content item up until the content item encounters another content item. Further, in additional embodiments, the document layout system floats up a content item when an unused space (e.g., the container 218) is available above the content item in the dynamic document 204 and can accommodate the content item as further described below.

In some example embodiments, the document layout system determines not to float up to the fourth content item 210*d* into the unused space based on restrictions associated with the first content item 210*a*, the fourth content item 210*d* or other content items. For example, the fourth content item 210*d* belongs to a set of content items that is belongs to a group or is located beyond a page delineator within the dynamic document 204.

In some embodiments, the document layout system receives input from a user modifying the horizontal alignment of a content item within the dynamic document 204 so long as the content item does not span the entire width of the dynamic document 204. For example, a user centers the first content item 210*a* in FIG. 2E such that the first content item 210*a* appears in the top middle of page two of the dynamic document 204. Upon receiving this user input, the document layout system detects a position conflict between the first content item 210*a* and the fourth content item 210*d*, and resolves the position conflict as discussed above (e.g., the document layout system moves the fourth content item 210*d* down within the dynamic document 204). In this manner, while the document layout system dynamically floats and pushes down content items within the dynamic document 204, the document layout system can also enable a user to specify where a content item is horizontally positioned (e.g., left, right, center, off-center, etc.) within the dynamic document 204. Further, as the document layout system moves the content item within the dynamic document 204, the document layout system can maintain the alignment of the content item specified by the user.

In one or more embodiments, the document layout system enables a user to copy and paste content items. For example, if an image content item includes a logo, the document layout system enables a user to copy the logo to multiple pages of the dynamic document 204. In various embodiments, the document layout system enables a user to specify that a content item repeats on each page of the dynamic document 204. For example, the document layout system repeats a content item in the header or footer of the dynamic document 204.

Turning now to FIGS. 3A-3C, which illustrate an example dynamic document that changes arrangement in response to updated dynamic content. As illustrated, FIG. 3A shows page two and page three of a dynamic document 304 that includes content items 310. In particular, page two of the dynamic document 304 includes a first content item 310*a*, a second content item 310*b*, and a third content item 310*c*, and page three of the dynamic document 304 includes a fourth content item 310*d* and a fifth content item 310*e*.

For illustrative and explanatory purposes, the pages of the dynamic document 304 in FIGS. 3A-3C roughly correspond to the pages of the dynamic document 204 in FIGS. 2A-2E. Further, while not illustrated for simplicity, a computing device (e.g., computing device 200) having a graphical user interface (e.g., graphical user interface 202) can display the dynamic document 304. For example, the document layout system generates the dynamic document 304 having the displayed arrangement of content items 310 and provides the dynamic document 304 to a computing device associated with a user. Accordingly, the dynamic document 304 in FIGS. 3A-3C share similar features and properties to the dynamic document 204 described with respect to FIGS. 2A-2E.

As mentioned above, the document layout system generates dynamic documents that include dynamic content items.

As shown in FIG. 3A, each of the content items 310 represents a dynamic content item having dynamic content. More specifically, each of the content items 310 in the dynamic document 304 is based on survey response data. As the document layout system receives and analyzes additional responses, the content within each of the content items 310 can update and change. As such, the dimensions of each content item can expand or shrink to display or otherwise accommodate the updated content.

As shown, the first content item 310a shows a customer satisfaction table having a header row 312 and a few data rows 314 that correspond to survey responses. As the document layout system receives additional responses, the document layout system can add those responses to the first content item 310a. To illustrate, the number of data rows 314 expands from nine in FIG. 3A to twenty-five in FIG. 3B. As a note, for purposes of explanation, only the first content item 310a of the dynamic document 304 changes dimension in response to receiving updated dynamic content from the document layout system.

As shown in FIG. 3B, the document layout system expands the first content item 310a upon receiving the additional dynamic content. Initially, the first content item 310a expands without regard to other content items within the dynamic document 304. In other words, the document layout system expands the first content item 310a without modifying the arrangement in the dynamic document 304. Accordingly, upon dynamically expanding, the first content item 310a overlaps (i.e., touches) other content items on page two of the dynamic document 304 (e.g., the second content item 310b and the third content item 310c).

In addition, the data rows 314 of the first content item 310a overflow on to page three of the dynamic document 304, which obstructs the fourth content item 310d. For illustrative purposes, the first content item 310a is shown as a transparent table such that the second content item 310b, third content item 310c, and fourth content item 310d are also visible. However, in many cases, content items are not transparent, and when a content item expands over another content item, the other content item will be partially of fully hidden from a user's view.

In response to expanding the first content item 310a, the document layout system detects one or more position conflicts. For example, the document layout system detects a position conflict between the expanded first content item 310a and the second content item 310b. In addition, the document layout system detects a position conflict between the expanded first content item 310a and both the third content item 310c and the fourth content item 310d.

Figures 9A, 9B:
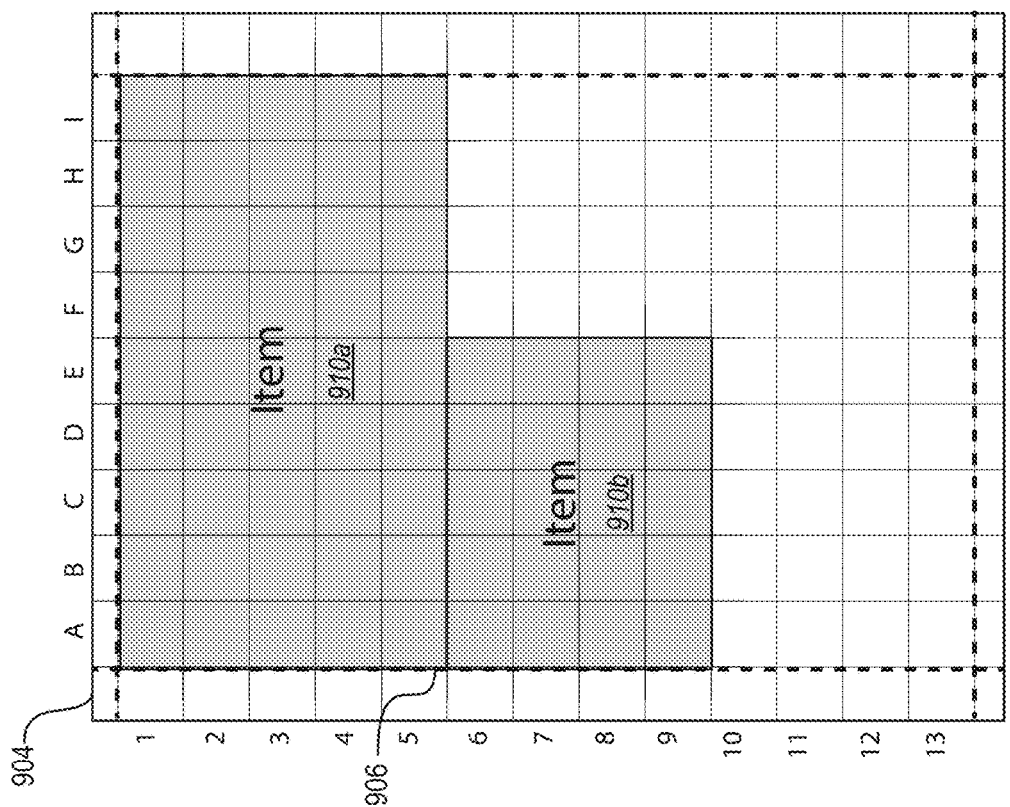
FIGS. 9A-9B illustrate an example document grid layout system that employs a content item list in accordance with one or more embodiments described herein.

When the document layout system detects multiple position conflicts, in some example embodiments, the document layout system first resolves the position conflict with the highest arranged content item (e.g., based on the order of each content item with a content item list as shown in FIG. 9B), then continues by resolving subsequent conflicts. For example, the document layout system resolves the position conflict between the expanded first content item 310a and the second content item 310b.

Resolving this conflict, however, may introduce additional position conflicts. For instance, if the document layout system moves the second content item 310b to below the expanded first content item 310a, the second content item 310b will likely conflict with the fifth content item 310e (while the third content item 310c and fourth content item 310d as still conflicted with the first content item 310a). Nevertheless, the document layout system can systematically resolve position conflicts between the highest ordered content items having a conflict to the lowest ordered content items having a conflict until all position conflicts are resolved. In some example embodiments, the document layout system resolves position conflicts by traversing content items from left-to-right, top-to-bottom. In this manner, the document layout system modifies and re-modifies the arrangement of content items in the dynamic document 304 until each position conflict is resolved.

As a note, in instances where multiple content items include dynamic content and change dimensions due to the document layout system receiving dynamic content updates, the document layout system does not need to perform additional steps to resolve each position conflict in the dynamic document. In other words, because the document layout system systematically resolves position conflicts, even if the majority of content items in a dynamic document are dynamic content items, the document layout system will quickly and efficiently resolve position conflicts in a single pass through the dynamic document.

FIG. 3C illustrates a modified arrangement of the content items 310 within the dynamic document 304 after the first content item 310a expanded. In particular, FIG. 3C illustrates the document layout system modifying the arrangement of the second content item 310b and the third content item 310c to be arranged below the first content item 310a so as to not overlap. Further, FIG. 3C illustrates the document layout system modifying the arrangement of the fourth content item 310d below the second content item 310b.

As shown in FIG. 3C, the first content item 310a expands to the point where it overflows from page two to page three of the dynamic document 304. As described above, text-based content items, such as tables, can span across multiple pages of a dynamic document. In particular, the document layout system can detect natural line divisions in a table content item (e.g., rows in the table) that assist the document layout system in determining where to break the table and post the remaining rows on the next page.

When the content item that spans across pages is a table, the document layout system can optionally display the header row at the top of each subsequent page (e.g., based on user preference). As shown in FIG. 3C, each page includes the header row 312. Alternatively, in example embodiments, the document layout system displays the header row for a table only as the first row of the table.

Similarly, when the content item is another type of text-based content item, the document layout system can optionally display the title of the content item above the content item on each page on which the content item appears. In one or more embodiments, the document layout system appends a label to the title, such as "continued" to indicate that the content item is continuing from the previous page. For example, if the fourth content item 310d continued to page 4 of the dynamic document 304, the document layout system displays the title "Customer Satisfaction Analysis (Continued)" above the continuing content.

As mentioned above, the document layout system can detect natural line divisions in a content item table. Likewise, the document layout system can also detect where to separate content in other text-based content items, such as blocks of text. Unlike tables that include naturally breaking rows at the root level (e.g., as stored in a document object model or DOM), blocks of text are generally stored in a single continuous string of words. As such, in one or more embodiments, the document layout system renders (e.g., prints out) the block of text within the parameters (e.g., width) of a content item to determine the line where to separate the text block. The document layout system can render the text in the dynamic document itself or in a separate text node (e.g., a blank document) and compare the rendering to the dimensions of the container of unused space in the dynamic document.

In some example embodiments, the document layout system first renders all the text in the content item to verify whether the text is too tall for the container. If so, the document layout system then renders word-by-word to determine the first word that exceeds the height of the container. In this manner, the document layout system determines the last word to include on one page (e.g., within a first sub-content item) and the first word to start with on the next page (e.g., a second sub-content item). The document layout system can continue this page-after-page until all words in the content item are displayed in the dynamic document.

As mentioned above, the document layout system provides additional features, tools, and instruments that further enhance the arrangement of a dynamic document. For example, one set of features includes page delineators. Another set of features includes grouping content items. Still another set of features includes fixed content items. As described below, FIGS. 4A-4C provide an example of a dynamic document arrangement having a page delineator and FIGS. 5A-6C provide an example of content item groups within a dynamic document.

Figure 4A:
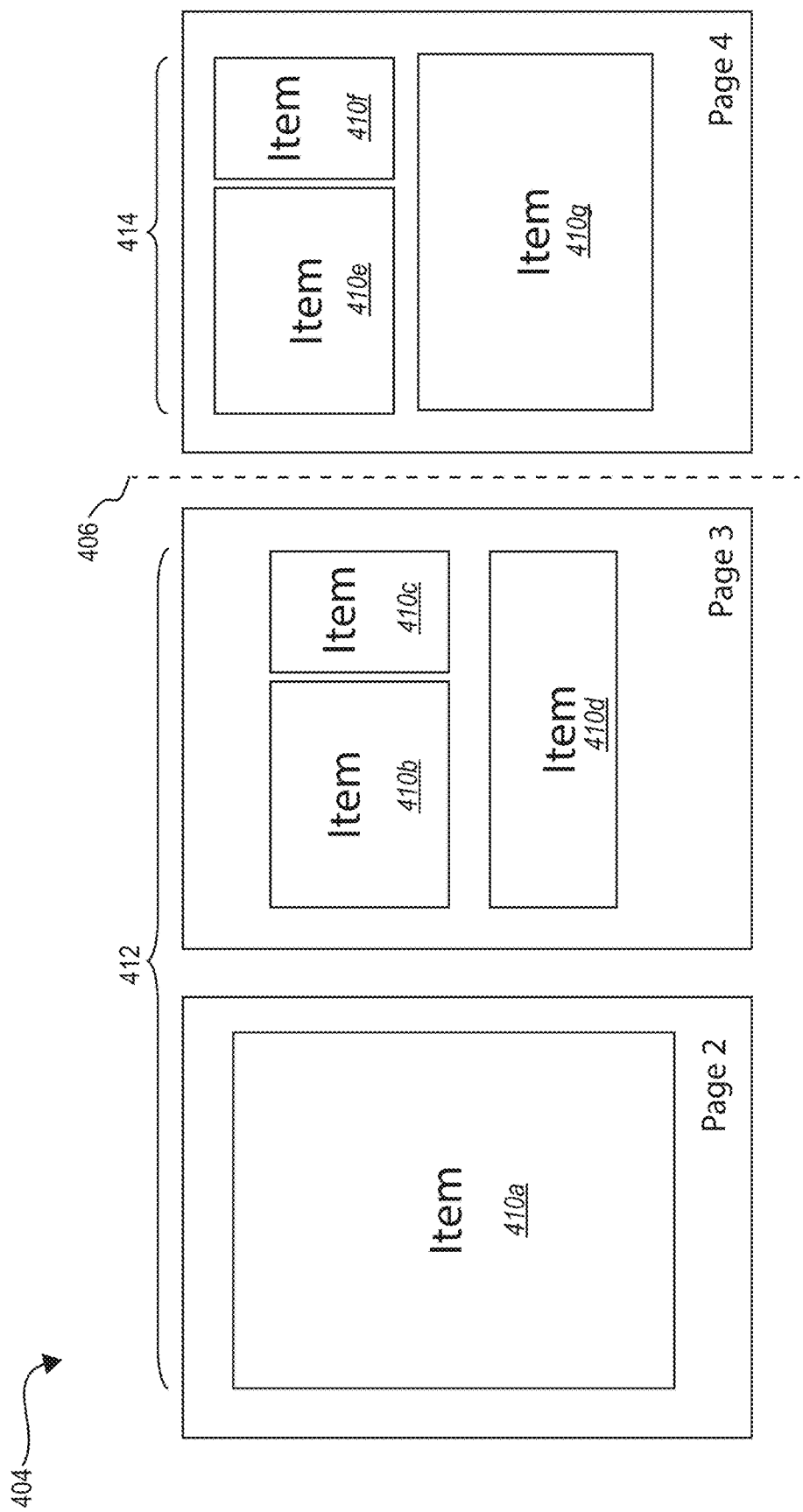
FIGS. 4A-4C illustrate an example dynamic document having an arrangement that employs page delineators in accordance with one or more embodiments described herein.
Figure 4B:
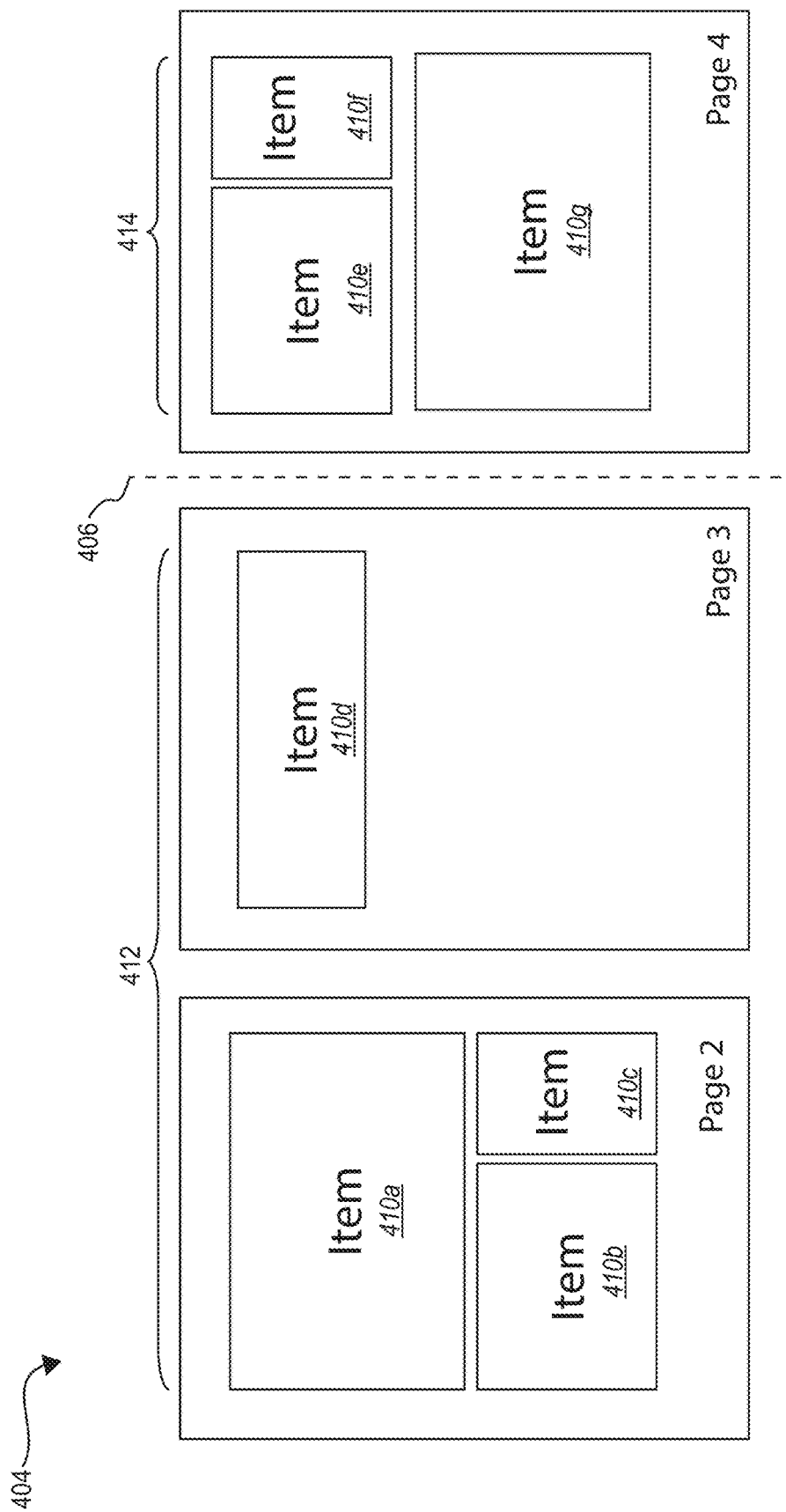
Figure 4C:
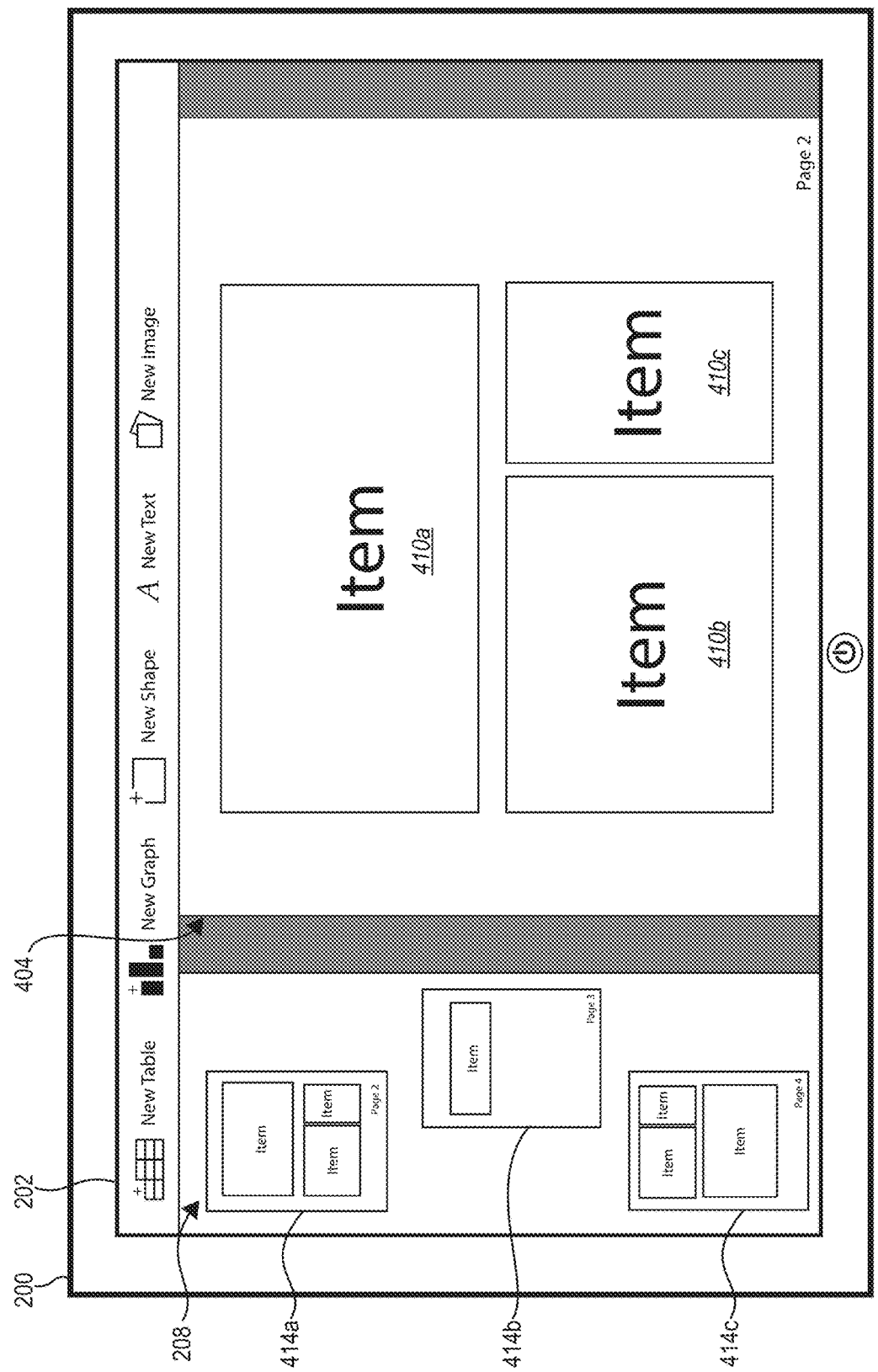

As just mentioned, FIGS. 4A-4C relate to a dynamic document having an arrangement with a page delineator. To illustrate, FIG. 4A shows a multi-page dynamic document 404 that includes an arrangement of content items (e.g., a first content item 410a, a second content item 410b, a third content item 410c, a fourth content item 410d, a fifth content item 410e, a sixth content item 410f, and a seventh content item 410g) collectively referred to as "content item 410." The dynamic document 404 also includes a page delineator 406.

As with FIGS. 3A-3C, FIGS. 4A-4B illustrate a dynamic document 404 having content items 410. One will appreciate, however, that a computing device (e.g., computing device 200) having a graphical user interface (e.g., graphical user interface 202) can display the dynamic document 404. For example, the document layout system generates the dynamic document 404 having the displayed arrangement of content items 410 and provides the dynamic document 404 to a computing device associated with a user (e.g., an administrator). Accordingly, the dynamic document 404 in FIGS. 4A-4B share similar features and properties to the dynamic document 204 described with respect to FIGS. 2A-2E. In fact, FIG. 4C shows the dynamic document 404 of FIGS. 4A-4B within the computing device 200.

Additionally, as shown in FIG. 4A, the dynamic document 404 includes content items 410 each simply labeled as an "Item." In addition, FIG. 4A shows a page delineator 406 (i.e., a page break) indicated by a dashed line. The page delineator 406 separates page two from page three of the dynamic document 404. More specifically, the page delineator 406 separates a first set 412 of content items on page two (e.g., the first content item 410a, second content item 410b, third content item 410c, and fourth content item 410d) from a second set 414 of content items on page three (e.g., the fifth content item 410e, sixth content item 410f, and seventh content item 410g) of the dynamic document 404.

As shown, the content items in the second set 414 start on a new page of the dynamic document 404 and remain separated from content items in the first set 412 of content items. Further, the page delineator 406 enforces a page break between the first set 412 of content items and second set 414 of content items. The document layout system maintains this division even when the document layout system modifies the arrangement and creates a container of unused space above/before the page delineator 406.

To illustrate, FIG. 4B shows an updated arrangement of the dynamic document 404. In particular, FIG. 4B shows the document layout system reducing the height of the first content item 410a. For example, the document layout system receives user input to shorten the height of the first content item 410a. Alternatively, the document layout system updates the content within the first content item 410a, which causes the document layout system to shorten the height of the first content item 410a. In any case, based on the first content item 410a reducing in size, the document layout system modifies the arrangement of content items 410 in the dynamic document 404 as described above.

In modifying the arrangement, as mentioned above, the document layout system maintains the page separation between content items within the first set 412 and content items in the second set 414 that are arranged after the page delineator 406. In particular, the document layout system moves up the remaining content items within the first set 412 up, which creates an unused space (i.e., a container) on page three of the dynamic document 404. Rather than moving up any of the content items in the second set 414 of content items, the document layout system maintains the second set 414 of content items on page three of the dynamic document 404, which is after the page delineator 406.

In one or more embodiments, the document layout system automatically inserts a page delineator in the arrangement. For example, if the document layout system determines a natural break between content items when generating a dynamic document, the document layout system inserts a page delineator between the content items. For instance, if the document layout system derives a first set of content items from a first set of survey responses and a second set of content items from a second set of survey responses, then the document layout system inserts a page delineator between the sets of content items. In this manner, even as content items within the sets of content items update and cause the document layout system to change the arrangement of a dynamic document, the document layout system preserves a natural break between the two sets of content items.

In addition, a user can insert one or more page delineators in a dynamic document. For example, a user provides user input that indicates one or more locations to insert a page delineator. Likewise, the user can provide input to remove an inserted page delineator. For instance, the user selects a page delineator along with an option to delete the page delineator. Upon deleting the page delineator, the document layout system can rearrange the dynamic document and float up any content items that were previously constrained by the page delineator. Further, in some embodiments, the user can provide input to move content items across a page delineator within an arrangement.

As mentioned above, FIG. 4C illustrates a computing device 200 having a graphical user interface 202 that displays the dynamic document 404 illustrated in FIGS. 4A and 4B. The computing device 200 can be the same computing device 200 described above with respect to FIGS. 2A-2D. As shown, the graphical user interface 202 displays page two of the dynamic document 404, which includes the first content item 410a, the second content item 410b, and the third content item 410c.

In addition, FIG. 4C illustrates the document preview panel 208 that includes a first document page preview 414a, a second document page preview 414b, and a third document page preview 414c. As shown, the document layout system indents the second document page preview 414b in the document preview panel 208 from the first document page preview 414a and the third document page preview 414c.

The document layout system, in one or more embodiments, indents a document page preview when a set of content items flow (i.e., continue) from one page to the next in a dynamic document. As shown, the document layout system indents the second document page preview 414b to indicate to a user that page two of the dynamic document 404 continues from the page one of the dynamic document 404. If additional pages in the dynamic document continued from page two of the dynamic document 404, the document layout system would show these pages as indented in the document preview panel 208. In this manner, a user can easily ascertain where one set of content items change to a next set, which is beneficial to the user as the arrangement of a dynamic document can continually change as content updates.

Further, the document layout system unindents one or more document page previews to indicate where a new set of content items begin in the dynamic document. As described above, the document layout system often inserts a page delineator between sets of content items. For example, the document layout system inserts page delineators between page three and page four of the dynamic document 404. Accordingly, the document preview panel 208 shows the third document page preview 414c as non-indented to indicate a page delineator within the dynamic document 404. One will appreciate that the document layout system can implement other techniques to indicate a page delineator between pages of a dynamic document, such as a line between two document page previews.

As mentioned above, FIGS. 5A-5B illustrates a dynamic document having an arrangement that includes a group of content items. To illustrate, FIG. 5A shows a single page of a dynamic document 504 that includes an arrangement of content items (e.g., a first content item 510a, a second content item 510b, a third content item 510c, and a fourth content item 510d) collectively referred to as "content item 510." As shown, the first content item 510a, second content item 510b, and third content item 510c are arranged into a content item group 506. As further shown, the fourth content item 510d is not included in the content item group 506.

As with other figures described above, FIGS. 5A-5B simply illustrate a dynamic document 504 having content items 510. One will appreciate that a computing device (e.g., computing device 200) having a graphical user interface (e.g., graphical user interface 202) can display the dynamic document 504. For example, the document layout system generates the dynamic document 504 having the displayed arrangement of content items 510 and provides the dynamic document 504 to a computing device associated with a user.

As mentioned above, the dynamic document 504 includes a content item group 506. In one or more embodiments, a user provides input to the document layout system to form a content item group. Additionally, or alternatively, the document layout system automatically forms a content item group. For instance, the document layout system groups a set of content items together based on tags associated with content items (e.g., a tag that indicates the survey question to which a content item corresponds) or based on performing an image/text analysis on the content within the content items (e.g., the document layout system determines matching terms among the content of the content items).

The document layout system, in some embodiments, associates content items in a content item group with one other. In other words, the document layout system keeps content items in a content item group together. As such, when the document layout system modifies the arrangement of the dynamic document, for example, due to receiving updated dynamic content, the document layout system maintains the content items together in the content item group.

In some example embodiments, the document layout system also maintains the arrangement of content items in a content item group when modifying the arrangement of a dynamic document. For example, the document layout system preserves the arrangement order of content items in a content item group even when a container of unused space is present. In other embodiments, when the document layout system receives an update to one or more content items in a content item group, the document layout system rearranges content items within a content item group as described above. For instance, the document layout system floats up and/or moves down content items in the content item group. In this manner, the document layout system can determine an optimal arrangement of content items within a grouping, which contributes to the overall arrangement of a dynamic document.

Returning to FIG. 5A, as shown, the content item group 506 separates the first content item 510a, second content item 510b, and third content item 510c from the fourth content item 510d. Further, the content item group 506 maintains the separations of content items even after the document layout system modifies the arrangement within the dynamic document 504. To illustrate, FIG. 5B shows the document layout system removing the second content item 510b. For example, the document layout system receives and processes user input removing the second content item 510b. As a result of removing the second content item 510b from the dynamic document 504, the document layout system shifts the third content item 510c left within the grouping creating a container of unused space in the bottom right of the content item group 506.

If not for the content item group 506, the document layout system would float the fourth content item 510d alongside the third content item 510c. However, because the fourth content item 510d is not part of the content item group 506, the document layout system maintains the fourth content item 510d below the content item group 506. Accordingly, as the content items in the content item group 506 expand and shrink, the document layout system can expand, shrink, and rearrange the content item group 506 while keeping the content items in the content item group 506 separate from other content items within the dynamic document 504.

In addition, to clustering content items together, the document layout system enables a user to edit multiple items within a group at the same time. For example, FIG. 6A illustrates a similar content item group 506 as shown in FIG. 5A. As shown, the document layout system groups a first content item 610a and second content item 610b with a third content item 610c to form the content item group 506. Further, the fourth content item 610d is not included in the content item group 506.

Moreover, as shown in FIG. 6A, the first content item 610a is an image-based content item, while the second content item 610b and the third content item 610c are text-based content items. As described above, the document layout system enables a user to edit the height and width of image-based content items and only the width of text-based content items as the document layout system automatically determines the height of text-based content items based on their content. As also described above, the document layout system provides handles 616 to a user on the left and right edges to resize the width of text-based content items, and for image-based content items, the document layout system also provides handles 616 on the top and bottom of the content item. For simplicity, FIG. 6A only labels one handle.

In addition to providing handles 616 for each content item, the document layout system can also provide group handles 618 to resize multiple content items in a content item group using a single command. To illustrate, the document layout system receives a first user input 620 to vertically stretch the content items within the content item group 506. As such, the document layout system expands the height of each image-based content item (e.g., the first content item 610a in the content item group 506). In general, the document layout system adjusts the dimensions of each content item within the content item group 506 proportionally to the magnitude of the user input received. Note, the document layout system does not stretch the height of text-based content items within the content item group 506 for the reasons described above.

The result of executing the first user input 620 is shown in FIG. 6B. As shown, the first content item 610a (e.g., an image-based content item) is expanded vertically while the height of the second content item 610b and the third content item 610c (e.g., text-based content items) remain unchanged. Further, based on the content item group 506 expanding vertically, the document layout system moves the fourth content item 610d further down in the dynamic document 504, for example, to another page. Additionally, because the fourth content item 610d is not part of the content item group 506, the height of the fourth content item 610d is unaffected by the first user input 620.

Figure 6C:
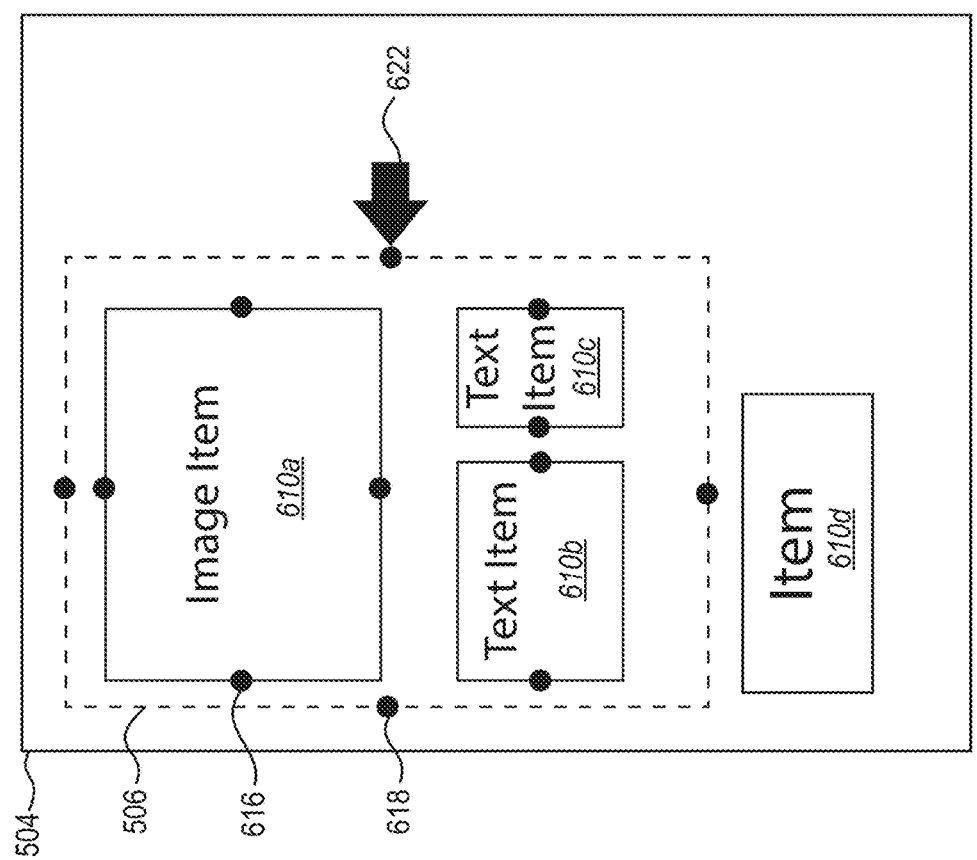

In an alternative example, as shown in FIG. 6C, the user provides a second user input 622 that shrinks the width of the content item group 506. As a result, the document layout system narrows the width of every content item within the content item group 506 (e.g., both image-based and text-based content items). In this manner, the document layout system enables a user to provide a single input that instructs the document layout system to simultaneously edit the dimensions of multiple content items within a content item group.

In another embodiment, when two content items are adjacent to each other within a content item group, a user provides input that expands the combined width of the content items to be larger than the width of the dynamic document 504. For example, if the second content item 610d and the third content item 610c are selected as a content item group, and the user provides input that expands the width of the content item group beyond the width of the dynamic document 504, the document layout system detects that both the expanded second content item 610d and the third content item 610c can no longer fit alongside each other. In other words, the document layout system detects a position conflict between the margins of the dynamic document 504, the second content item 610d, and the third content item 610c. Accordingly, the document layout system resolves the position conflict by repositioning either the second content item 610d and the third content item 610c, as described above.

While FIGS. 6A and 6C show the handles 616 on the side edges of the content item group 506, in one or more embodiments, the document layout system places handles at one or more corners of the content item group 506. In this manner, a user can provide input to the document layout system to resize the height (where applicable) and width of content items within the content item group 506 at the same time. In some example embodiments, the document layout system does not provide graphic elements to indicate handles, but provides resizing functionality upon a user selecting an edge of the content item group 506. One will appreciate that the document layout system can provide numerous ways for a user to provide input to select and resize the content item group 506.

In various embodiments, the document layout system locks a content item content item with the content item group 506. For example, the document layout system locks the dimensions of a content item within a content item group upon receiving user input locking the content item. Locking a content item can prevent the content item from changing dimensions when user input is received to expand or shrink the dimensions of the content item group 506. For instance, if a user provides input to the document layout system to expand the width of a content item group, the document layout system proportionally increases the width of each content item within the content item group except for the locked content item, which maintains the same width.

As shown in FIGS. 6A-6C, a content item group can maintain its grouping over time. Stated differently, a content item group keeps the same content items grouped until user input is received to ungroup the content items or modify the content items within the content item group. In some example embodiments, the document layout system enables a user to temporarily form a content item group 506. For example, the document layout system receives user input selecting multiple content items for the purpose of resizing the selected content items. Then, upon resizing the selected content items, the document layout system ungroups the content items.

In additional embodiments, the document layout system enables a user to select non-neighboring content items within a dynamic document. To illustrate, using FIG. 6C as an example, the document layout system receives user input selecting the first content item 610a and the fourth content item 610d to form a temporary content item group. The document layout system then receives user input to resize the width of the temporary content item group. Upon resizing the temporary content item group, the document layout system ungroups the first content item 610a from the fourth content item 610d.

Furthermore, in some example embodiments, the document layout system rearranges content items in a dynamic document based on modifications made to a content item group. For example, upon narrowing each content item in the content item group 506 in FIG. 6C, the document layout system determines that the fourth content item 610d now fits alongside the content item group 506 (and within the page margin). Accordingly, the document layout system floats the fourth content item 610d up to be alongside the first content item 610a within the dynamic document 504. In addition, the document layout system can move another content item up within the arrangement to be alongside the content item group 506, when space to fit the content item is available.

Figure 7C:
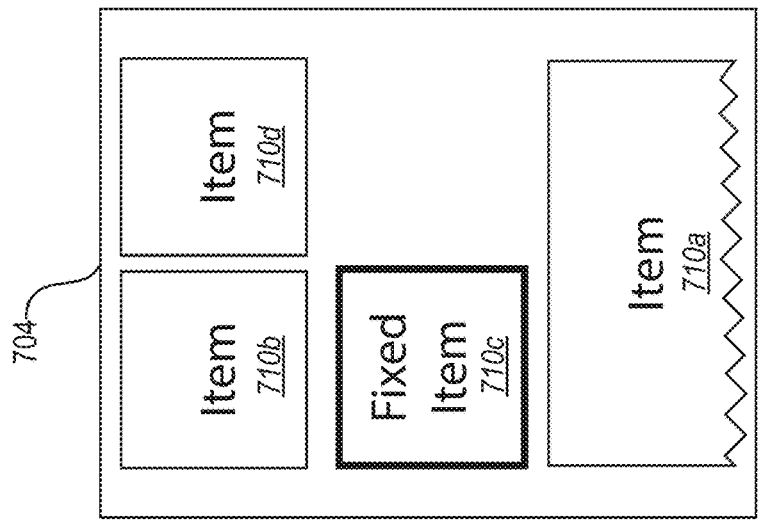
FIGS. 7A-7C illustrate an example dynamic document having a fixed content item in accordance with one or more embodiments described herein.
Figure 7B:
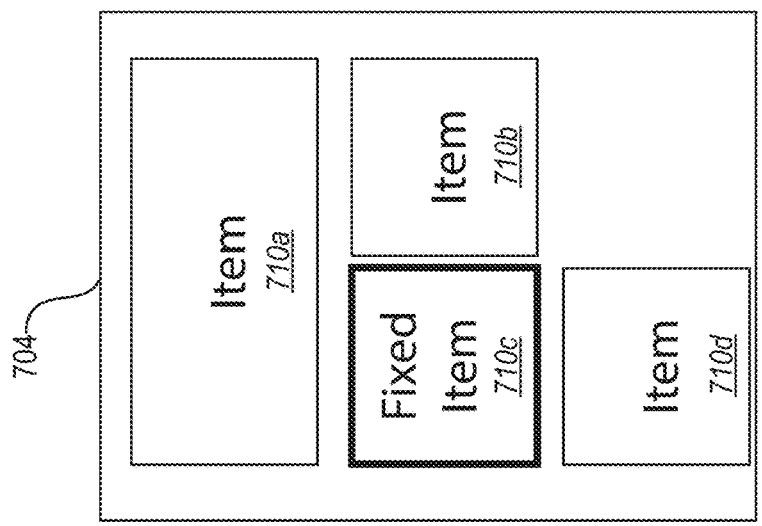
Figure 7A:
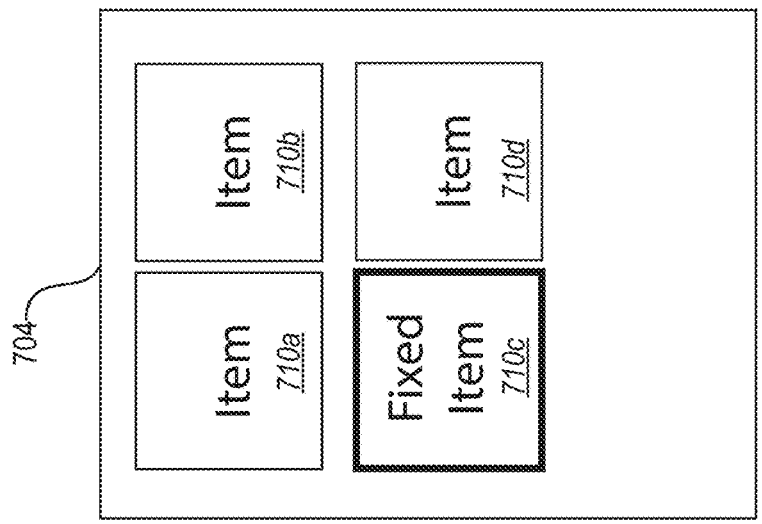

Turning now to FIGS. 7A-7C, which illustrate fixed content items within the arrangement of a dynamic document. In particular, FIG. 7A illustrates a dynamic document 704 that includes multiple content items 710 (e.g., a first content item 710a, a second content item 710b, a third content item 710c, and a fourth content item 710d). Of note, the third content item 710c is a fixed content item. In general, a fixed content item does not change position within the dynamic document when the document layout system is modifying the arrangement of content items within the dynamic document.

As with other figures described above, FIGS. 7A-7C simply illustrate a dynamic document 704 having content items 710. One will appreciate that a computing device (e.g., computing device 200) having a graphical user interface (e.g., graphical user interface 202) can display the dynamic document 704. For example, the document layout system generates the dynamic document 704 having the displayed arrangement of content items 710 and provides the dynamic document 704 to a computing device associated with a user.

As mentioned above, the third content item 710c is a fixed content item. As such, the document layout system maintains the arrangement of the third content item 710c. For instance, the document layout system receives a dynamic content update for the first content item 710a that causes the document layout system to expand the first content item 710a. As shown in FIG. 7B, the document layout system expands the first content item 710a and, in response, modifies the arrangement of the dynamic document 704 to resolve any position conflicts caused by the dynamic content update.

Because the third content item 710c is a fixed content item, the document layout system does not modify or reposition the third content item 710c when updating the arrangement. As shown, the document layout system moves the second content item 710b from before the third content item 710c to after the third content item 710c within the arrangement. The document layout system also shifts the fourth content item 710d down within the modified arrangement.

Upon receiving an additional alternative dynamic content update for the first content item 710a, the document layout system again expands the first content item 710a. For example, the dynamic content update causes the document layout system to increase the height of the first content item 710a. Because the third content item 710c is a fixed content item, the document layout system causes a position conflict due to increasing the height of the first content item 710a. In other words, the document layout system vertically expands the first content item 710a into the third content item 710c.

To resolve the position conflict, the document layout system moves the first content item 710a below the third content item 710c, as shown in FIG. 7C. In particular, FIG. 7C shows a truncated version of the first content item 710a moved below the third content item 710c. The truncated version of the first content item 710a continues down the dynamic document 704, for example, either on the same page, or spanning on to the next page of the dynamic document 704.

FIG. 7C also shows the document layout system moving the second content item 710b and the fourth content item 710d above the third content item 710c within the arrangement. Specifically, the document layout system first moves the first content item 710a to below the third content item 710c to resolve the position conflict described above. As a result, the dynamic document 704 now has an available container of unused space above the third content item 710c where the first content item 710a was previously positioned as shown in FIG. 7B. To fill the container and optimize the arrangement, the document layout system relocates the second content item 710b and the fourth content item 710d to the top of the dynamic document 704, as shown in FIG. 7C.

While the document layout system does not change the position of fixed content items within an arrangement, in one or more embodiments, the document layout system enables a fixed content item to change dimensions when the fixed content item is also a dynamic content item. For example, if the third content item 710c is also a dynamic content item, then upon receiving a dynamic content update for the third content item 710c, the document layout system expands or shrinks the dimensions of the third content item 710c accordingly. Then, because the third content item 710c is a fixed content item, the document layout system resolves position conflicts in the arrangement by moving other content items away from the third content item 710c.

Figure 8B:
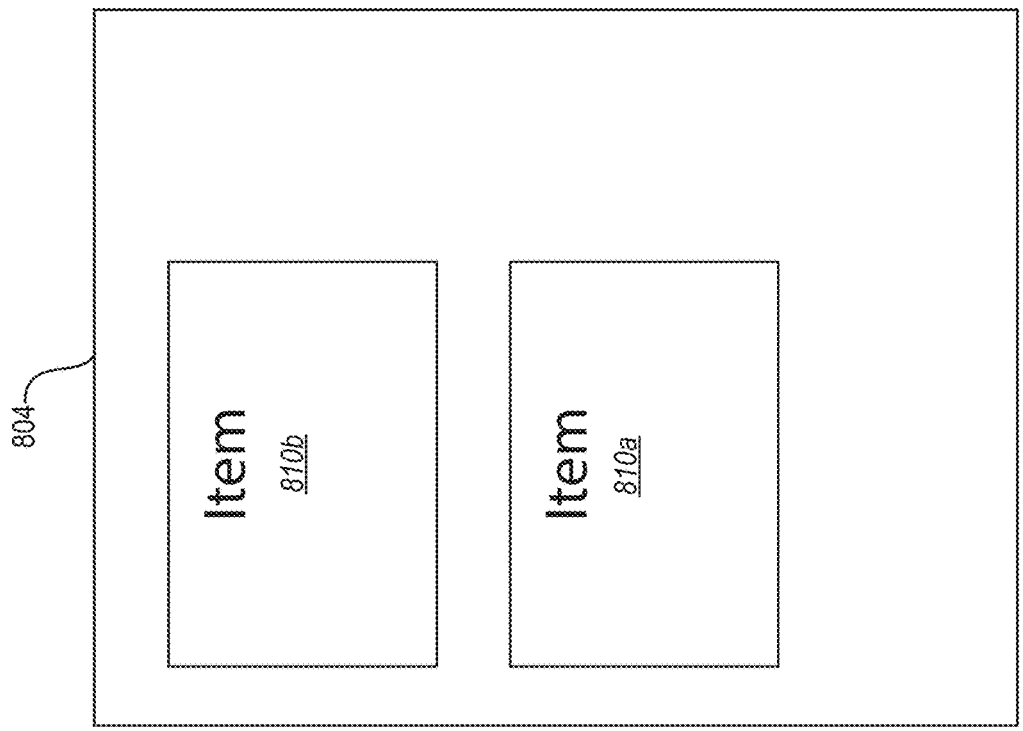
FIGS. 8A-8B illustrate moving content items within a dynamic document based on user input in accordance with one or more embodiments described herein.
Figure 8A:
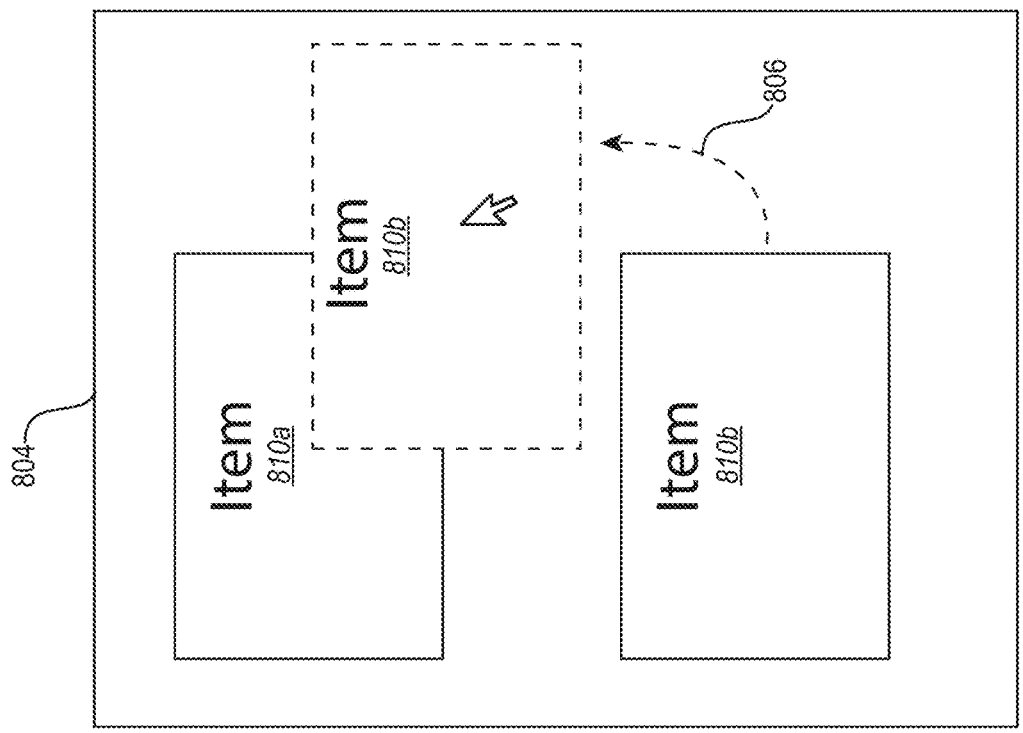

As mentioned above, the document layout system enables a user to manually arrange content items with a dynamic document. In one or more embodiments, the document layout system assists a user by inferring the user's intent when modifying content items within a dynamic document arrangement. To illustrate, FIG. 8A illustrates a dynamic document 804 having an arrangement of a first content item 810a and a second content item 810b. As with the above-described figures, a computing device (e.g., computing device 200) having a graphical user interface (e.g., graphical user interface 202) can display the dynamic document 804.

As shown in FIG. 8A, the document layout system receives a user input 806 to move the second content item 810b above the first content item 810a within the arrangement. In particular, the dashed outline of the second content item 810b indicates the user moving the second content item 810b within the dynamic document 804. For instance, the document layout system detects the user input 806 based on the user using a cursor or another input source to select and drag the second content item 810b up within the dynamic document 804.

The document layout system, in one or more embodiments, determines that the user desires to move the first content item 810a above the second content item 810b based on movement and velocity of the user input 806. For example, the document layout system detects that the top of the second content item 810b overlaps the height of the first content item 810a by at least 50% (or another predetermined amount). In another example, the document layout system determines that the directional velocity (e.g., movement inertia) of the user input 806 is moving the second content item 810b to above the first content item 810a at least at a predetermined rate, which indicates the user's intent to move the second content item 810b above the first content item 810a.

Upon detecting the user's intent from the user input 806, the document layout system moves the second content item 810b to where the first content item 810a is located in the arrangement. Then, detecting a position conflict between the first content item 810a and the second content item 810b, the document layout system re-arranges the first content item 810a to below the second content item 810b to resolve the position conflict. FIG. 8B shows the resulting arrangement.

Turning now to FIG. 9A, additional description will now be provided regarding creating an arrangement in a dynamic document, detecting position conflicts, and resolving position conflicts through modifying the arrangement in a dynamic document. As shown, FIG. 9A illustrates an example grid layout of a dynamic document that the document layout system employs to create an arrangement in a dynamic document. In particular, FIG. 9A illustrates a dynamic document 904 having a first content item 910a and a second content item 910b. FIG. 9A also shows margins 906 represented by bold dashed lines. As shown, FIG. 9A organizes the grid layout in columns (e.g., A-I) and rows (e.g., 1-13), however, that the document layout system can additionally (or in the alternative) employ an x-axis/y-axis coordinate system.

As a note, while FIG. 9A shows a particular grid layout and margins 906, one will appreciate that the document layout system can employ other grid and margin sizes. For example, on the one hand, the size of a dynamic document can be a single pixel or even a fraction of a pixel. On the other hand, a dynamic document can be near-infinite in size. As described above, operations performed by the document layout system scale linearly based on the number of content items within a dynamic document, not exponentially based on the size of the dynamic document.

FIG. 9B illustrates a content item list 920 that includes an id 922, position 924, and dimension 926 for each content item. In some embodiments, the content item list 920 also includes addition and/or alternative columns. For example, the content item list 920 includes one or more ending positions (e.g., the location of one or more corners). In addition, the content item list 920 specifies the content item type for each content item or whether the content item is fixed. As another example, the content item list 920 can also indicate whether a content item is a dynamic content item and/or when the content item was created/last updated. Further, the content item list 920 can separate the dimension 926 for each content item by height and width in individual columns.

The document layout system, in one or more embodiments, generates content items from analyzing other content. For example, the document layout system receives content from survey responses, analyzes the content, and generates one or more content items based on the analysis. In some embodiments, the document layout system receives content items from a third-party source. For instance, a content item provider provides one or more content items to the document layout system. In various embodiments, the document layout system receives one or more content items from a template of content items, such as a user-created template that includes logos and other information, or a system-generated template selected by the user.

Irrespective of how the client device obtains a content item, the document layout system can populate the dynamic document 904 with each received content item in an optimal arrangement. In other words, the document layout system, in one or more embodiments, populates the content item list 920 as it adds each content item to the dynamic document 904 as part of the arrangement. For example, upon receiving content for the first content item 910a, the document layout system assigns a unique id 922 to the content item. In addition, the document layout system adds the first content item 910a to the dynamic document 904 at position A1 and stores the position 924 (e.g., A1) and dimension 926 (e.g., 5×8) in the content item list 920.

To add the second content item 910b to the dynamic document 904, in one or more embodiments, the document layout system determines at which position to add the next content item. In these embodiments, the document layout system uses the content item list 920 to determine the next available position in the grid layout to locate the second content item 910b. For example, the document layout system considers the position, dimension, and other dynamic document properties (e.g., dynamic document dimensions, margin amounts, buffer size/distance, padding size, etc.). The document layout system can also start by considering the last content item listed in the content item list 920 when checking for the next available position.

To demonstrate by way of example, FIG. 9B shows the document layout system adding the second content item 910b to the dynamic document 704. In particular, the document layout system initially determines whether the second content item 910b can fit alongside the first content item 910a. In one example, the document layout system subtracts the width of the first content item 910a (stored as part of the dimension 926 in the content item list 920) and a horizontal content item buffer distance (e.g., one column) from the width of the page to determine if the width of the second content item 910b fits alongside the first content item. In another example, the document layout system adds the widths of the first content item 910a and the second content item 910b (plus the horizontal buffer distance) to determine if the combined width fits within the page width.

In alternative embodiments, each content item has a margin that is defined to provide padding between content items (e.g., the content item buffer), and the document layout system measures the widths of the content items (which includes the content item margin) without any additional padding when determining the dynamic position of the content items. In some embodiments, the document layout system only includes the padding for a content item when the corresponding edge of the content item is adjacent to another content item, but not when the content item abuts a page margin.

If the second content item 910b fits alongside the first content item 910a, the document layout system places the second content item 910b in the same row as the first content item 910a at and in a column at least a horizontal buffer distance away (e.g., at least one column) from the right edge of the first content item 910a. If, however, the second content item 910b does not fit alongside the first content item 910a, the document layout system identifies a position below the first content item 910a to locate the second content item 910b.

To demonstrate, the document layout system uses the height of the first content item 910a (identified from the dimension 926 in the content item list 920) added to the position 924 to determine the row in the grid layout where the first content item 910a ends (e.g., row 5). Using the determined row, the document layout system positions the second content item 910b in the first column at the desired row (e.g., A6). In one or more embodiments, the document layout system adds a vertical content item padding distance (e.g., one row) before positioning the second content item 910b (e.g., the second content item 910b starts at A7). Further, the document layout system adds the second content item 910b to the content item list 920 along with an id 922 that uniquely identifies the second content item 910b.

While the above description details the document layout system adding the first content item 910a and the second content item 910b included in FIGS. 9A and 9B, one will appreciate that the document layout system can employ similar actions to arrange any number of content items to a dynamic document. For example, if a dynamic document has multiple content items arranged alongside each other in a dynamic document, the document layout system can determine if an additional content item can also be added alongside the last added content item (e.g., the content item located further to the right), or if the additional content item should be placed further below.

As another example, when placing a new content item below another content item, the document layout system verifies that the new content item does not overlap with or touch existing content items. For instance, a dynamic document includes two content items alongside each other that end on different rows (e.g., one content item extends farther down the dynamic document than the other). Further, the document layout system first determines that the new content item cannot fit along above content items. As such, the document layout system determines which content item between the two extends farther down and places the new content item below that content item.

In one or more embodiments, the document layout system uses the content item list 920 to define the arrangement order of content items in a dynamic document. In general, the content item list 920 lists content items placed in the dynamic document left-to-right, top-to-bottom. For example, as described above, the document layout system determines and resolves position conflicts in a systematic fashion by progressing through each content item according to its arrangement order. For instance, the document layout system determines if the position 924 and dimension 926 of a content item touches the position of any other subsequent content items within the content item list 920 (especially after the document layout system updates the dimension of a content item based on receiving dynamic content). In particular, the document layout system detects a position conflict by determining if the position plus the height and/or width of the content item results in a row and/or column that is the same, or greater than the row and/or height of where a subsequent content item has a position. If so, the document layout system repositions the conflicting content items as described above and updates the content item list 920 to reflect the change. The document layout system then progresses to the next content item in the content item list 920 to determine and resolve position conflicts. The document layout system continues this pattern until the bottom of the content item list 920 is reached.

In some embodiments, the content item list 920 also includes containers of unused space. For example, if an arrangement has a container above a minimum dimension (e.g., height and width) between two content items in the dynamic document, the document layout system places the container within the content item list 920. In this manner, upon modifying the arrangement, the document layout system can quickly identify a content item matches (or is smaller) than the dimension of the container of unused space as well as replace the container with identified content item, both in the dynamic document 904 and in the content item list 920.

As mentioned above, employing a content item list 920 is less memory intensive than the grid system employed by some conventional document design systems. For example, the document layout system maintains a single row of text for each content item stored within the content item list 920. In contrast, conventional document design systems require that each cell in a two-dimensional array include one or more element references. Under this system, the majority of data is duplicative, which wastes memory and processing resources.

Figure 10:
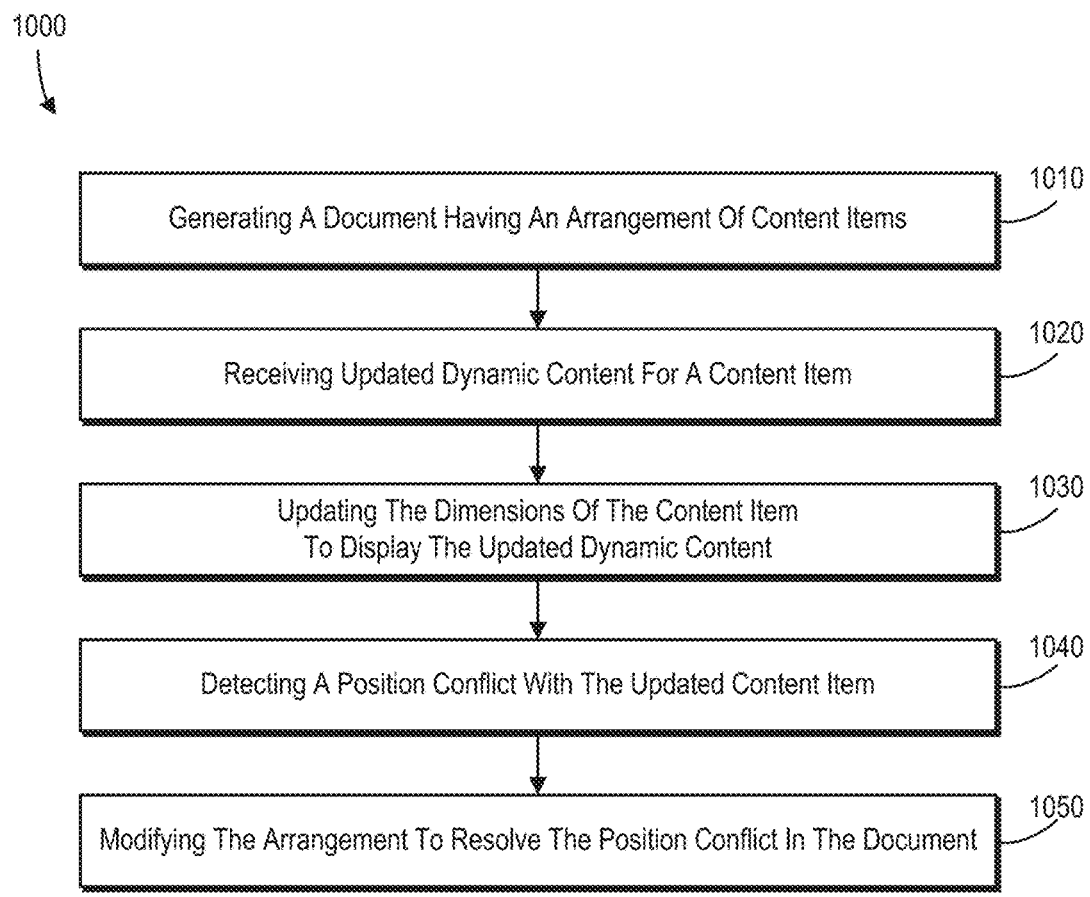
FIG. 10 illustrates an example flow diagram of a method for resolving arrangement conflicts in accordance with one or more embodiments described herein.

FIG. 10 illustrates an example flow diagram of a method 1000 for resolving arrangement conflicts in accordance with one or more embodiments described herein. The method 1000 can be implemented by one or more embodiments of the document layout system described above. For example, the server device 101 hosting the document layout system 102 performs the method 1000.

The method 1000 includes an act 1010 of generating a document 204 having an arrangement of content items 210. In particular, the act 1010 can involve generating a dynamic document 204 that includes an arrangement of a first content item 210*a* having dynamic content and a second content item 210*b*. In one or more embodiments, the act 1010 includes positioning the first content item at a first position in the arrangement, positioning, based on the dimensions of the first content item and further based on the second content item fitting within one or more margins of the dynamic document, the second content item at a second position that is non-overlapping with the first content item. In additional embodiments, the method 1000 includes an act of collecting responses from a plurality of respondents, analyzing the collected responses to obtain a plurality of results, and organizing the plurality of results into the content items.

The method 1000 also includes an act 1020 of receiving updated dynamic content for a content item of the content items. In particular, the act 1020 can involve receiving updated dynamic content for the first content item 210*a*. In some embodiments, one or more content items are text-based content items having a user-adjustable width, where the height of each text-based content item is determined based on an amount of content within the text-based content item. Further, a text-based content item can overflow from one page of the dynamic document to a next page of the dynamic document. In some embodiments, one or more content items are image-based content items that each have a user-adjustable width and a user-adjustable height, where the dimensions of each image-based content item are restricted to dimensions (e.g., margins) of the dynamic document.

In addition, the method 1000 includes an act 1030 of updating the dimensions of the content item to display the updated dynamic content. In particular, the act 1030 can involve updating, within the dynamic document 204, the first content item 210*a* by updating dimensions of the first content item 210*a* to display the updated dynamic content. In some embodiments, the act 1030 includes determining that updating the dimensions of the first content item expands the dimensions of the updated first content item. In other embodiments, the act 1030 includes determining that updating the dimensions of the first content item reduces the dimensions of the updated first content item.

The method 1000 also includes an act 1040 of detecting a position conflict with the updated content item 210*a*. In particular, the act 1040 can involve detecting, within the dynamic document 204, a position conflict between the updated first content item 210*a* and the second content item 210*b*. In one or more embodiments, when the dimensions of the updated first content item are expanded, the act 1040 includes detecting the position conflict by detecting that the updated first content item touches the second position of the second content item. In other embodiments, when the dimensions of the updated first content item are reduced, the act 1040 includes detecting the position conflict by detecting that the updated first content item has created a container of unused space at a third position within the arrangement between the updated first content item and the second content item.

Further, the method 1000 includes an act 1050 of modifying the arrangement to resolve the position conflict in the dynamic document 204. In particular, the act 1050 can involve modifying, in response to detecting the position conflict, the arrangement of the second content item 210*b* with respect to the updated first content item 210*a* to resolve the position conflict in the dynamic document 204. In one or more embodiments, when the dimensions of the updated first content item are expanded, the act 1050 includes modifying the arrangement by moving the second position of the second content item away from the updated first content item until the second content item is non-overlapping with the updated first content item. In other embodiments, when detecting that the updated first content item has created a container of unused space, the act 1050 includes modifying the arrangement by replacing the container of unused space with the second content item by moving the second position of the second content item up to replace the container of unused space.

Also, the method 1000 can include one or more additional acts. For example, in one or more embodiments, the method 1000 includes the act of maintaining a content item list that stores an identifier, position, and dimensions of the first content item and the second content item, where the dimensions of the first content item includes a height and a width of the first content item, and where the dimensions of the first content item are updated within the content item list upon receiving the updated dynamic content for the first content item. In additional embodiments, the method 1000 includes the act of employing the content item list to detect position conflicts within the dynamic document, where detecting the position conflict between the updated first content item and the second content item in the dynamic document includes detecting that the position plus the height of the updated first content item touches the position of the second content item, and where modifying the arrangement includes positioning the second content item at a third position determined by adding the first position of the updated content item with the height of the updated first content item. In some embodiments, the position plus the height of the updated first content item touches the position of the second content item when a bottom edge of the updated first content item overlaps with the position of the second content item.

In one or more embodiments, the method 1000 includes the acts of paginating the dynamic document into a first page and a second page, where modifying the arrangement includes expanding the updated first content item within the first page of the dynamic document, moving the second content item to below the updated first content item on the first page of the dynamic document based on expanding the updated first content item, detecting that the second content item overlaps one or more margins of the first page of the dynamic document, and moving, based on the detection, the second content item to the second page of the dynamic document. In additional embodiments, the method 1000 includes determining that a third content item below the second content item on the second page of the dynamic document is smaller than the second content item, where modifying the arrangement further includes moving the third content item to the first page of the dynamic document, and where the third content item fits alongside the first content item and within the one or more margins of the first page of the dynamic document.

In some embodiments, the method 1000 includes the acts of paginating the dynamic document into a first page and a second page, detecting that the updated first content item is larger than the first page, splitting the first content item into a first sub-content item and a second sub-content item, positioning the first sub-content item on the first page of the dynamic document, and positioning the second sub-content item on the second page of the dynamic document. In various embodiments, the method 1000 includes the acts of detecting user input narrowing the width of the first content item within the dynamic document; determining, based on the user input narrowing the width of the first content item, that the second content item fits alongside the first content item within the dynamic document; and moving, based on the determination, the second content item alongside the first content item.

In a number of embodiments, the method 1000 includes the act of identifying the second content item as a fixed content item, where modifying the arrangement of the dynamic document includes resolving the position conflict within the dynamic document by moving, based on the second content item being a fixed content item, the updated first content item to a new position within the arrangement without moving the second content item. In some embodiments, the method 1000 includes the acts of grouping the first content item and the second content item in a group, receiving user input adjusting the width of the group, and adjusting the width of the first content item and the width of the second content item proportionally based on the received user input.

In one or more embodiments, the method 1000 includes the acts of creating, a page delineator between a first page of the dynamic document and a second page of the dynamic document, where the page delineator separates the first content item on the first page of the dynamic document and the second content item on the second page of the dynamic document; expanding, based on receiving the updated dynamic content, the updated first content item to display on both the first page of the dynamic document and the second page of the dynamic document; moving, in response to displaying the updated content item on both the first page of the dynamic document and the second page of the dynamic document, the page delineator between the second page of the dynamic document and a third page of the dynamic document; and modifying, based on moving the page delineator between the second page of the dynamic document and a third page of the dynamic document, the arrangement to move the second content item to the third page of the dynamic document after the page delineator.

Figure 11:
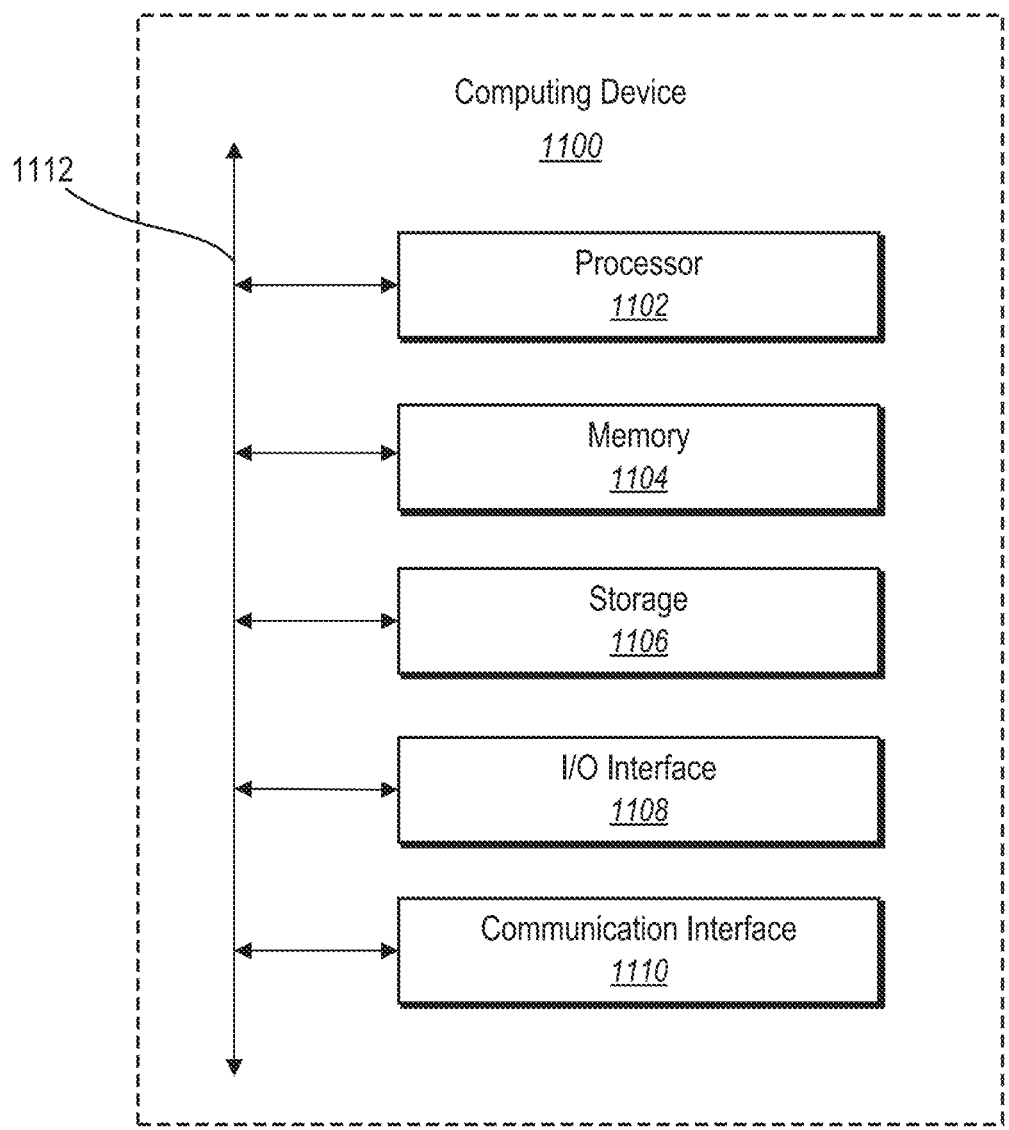
FIG. 11 illustrates a block diagram of an exemplary computing device in accordance with one or more embodiments described herein.

FIG. 11 illustrates a block diagram of exemplary computing device 1100 that may be configured to perform one or more of the processes described above. One will appreciate that the computing device 1100 may represent one or more computing device (e.g., client devices or server devices), such as those described previously. For example, the computing device 1100 embodies server device 101, administrator device 106, respondent devices 108, or computing device 200, each which are described above. Further, the computing device 1100 can implement one or more of the graphical user interfaces 202 previously described.

In some embodiments, users of the computing device 1100 may include an individual (i.e., a human user), a business, a group, or other entity. Further, the computing device 1100 may represent various types of computing devices. One type of computing device includes a mobile device (e.g., a cell phone, a smartphone, a PDA, a tablet, a laptop, a watch, a wearable device, etc.). Another type of computing device includes a non-mobile device (e.g., a desktop or server; or another type of client device).

As shown in FIG. 11, the computing device 1100 can include a processor 1102, a memory 1104, a storage 1106 device, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11.

In one or more embodiments, the processor 1102 includes hardware for executing instructions, such as those making up a computer program. The memory 1104 may be used for storing data, metadata, and programs for execution by the processor 1102(s). The storage 1106 device includes storage 1106 for storing data or instructions.

The I/O interface 1108 allows a user to provide input to, receive output from, and otherwise transfer data to and receive data from the computing device 1100. The I/O interface 1108 may include a mouse, a keypad or a keyboard, a touchscreen, a camera, an optical scanner, network interface, modem, other known I/O devices or a combination of I/O interfaces. The I/O interface 1108 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, the communication interface 1110 may include a network interface controller (NIC) or network adapter for communicating with an Ethernet or other wire-based network or a wireless NIC (WNIC) or wireless adapter for communicating with a wireless network, such as a WI-FI. The communication infrastructure may include hardware, software, or both that connects components of the computing device 1100 to each other. As an example, the communication infrastructure may include one or more types of buses.

As mentioned above, embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor receives instructions, from a non-transitory computer-readable medium, (e.g., memory 1104, etc.), and executes those instructions, thereby performing one or more processes, including one or more of the processes described herein.

Non-transitory computer-readable storage 1106 media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Computer-executable instructions include, for example, instructions and data which, when executed by a processor, cause a general-purpose computer, a special-purpose computer, or a special-purpose processing device to perform a certain function or group of functions. In some embodiments, a general-purpose computer executes computer-executable instructions, which turns the general-purpose computer into a special-purpose computer implementing elements of the disclosure.

Those skilled in the art will appreciate that the disclosure may be practiced in network computing environments with many types of computer system configurations. The disclosure may also be practiced in distributed system environments where local and remote computer systems, which are linked through a network, both perform tasks. Embodiments of the present disclosure can also be implemented in cloud computing environments. In this description, "cloud computing" is defined as a model for enabling on-demand network access to a shared pool of configurable computing resources.

Figure 12:
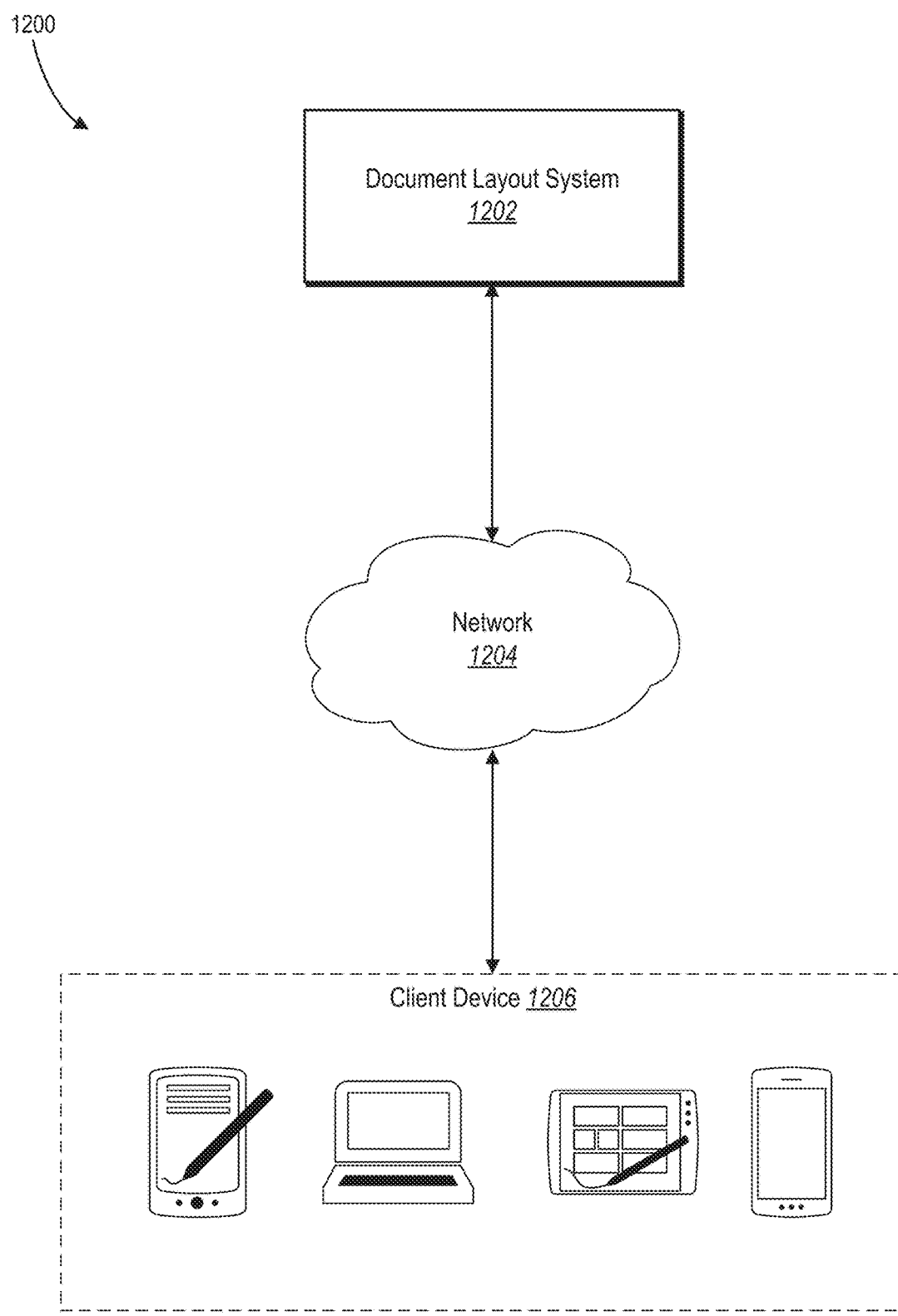
FIG. 12 illustrates an example network environment of a document layout system in accordance with one or more embodiments described herein.

FIG. 12 illustrates an example network environment 1200 of a document layout system 1202, such as embodiments of the content management system described herein. The network environment 1200 includes the document layout system 1202 and a client device 1206 connected to each other by a network 1204. Although FIG. 12 illustrates a particular arrangement of the document layout system 1202, the client device 1206, and the network 1204, one will appreciate that other arrangements of the network environment 1200 are possible. For example, a client device of the client device 1206 is directly connected to the document layout system 1202. Moreover, this disclosure contemplates any suitable number of client systems, content management systems, and networks are possible. For instance, the network environment 1200 includes multiple client systems.

This disclosure contemplates any suitable network. As an example, one or more portions of the network 1204 may include an ad hoc network, an intranet, an extranet, a VPN, a LAN, a wireless LAN, a WAN, a wireless WAN, a MAN, a portion of the Internet, a portion of the Public Switched Telephone Network (PSTN), a cellular telephone network, a safelight network, or a combination of two or more of these. The term "network" may include one or more networks and may employ a variety of physical and virtual links to connect multiple networks together.

In particular embodiments, the client device 1206 is an electronic device including hardware, software, or embedded logic components or a combination of two or more such components and capable of carrying out the appropriate functionalities implemented or supported by the client system. As an example, the client device 1206 includes any of the computing devices discussed above. The client device 1206 may enable a user at the client device 1206 to access the network 1204. Further, the client device 1206 may enable a user to communicate with other users at other client systems.

In some embodiments, the client device 1206 may include a web browser, such as and may have one or more add-ons, plug-ins, or other extensions. The client device 1206 may render a web page based on the HTML files from the server for presentation to the user. For example, the client device 1206 renders the graphical user interface described above.

In one or more embodiments, the document layout system 1202 includes a variety of servers, sub-systems, programs, modules, logs, and data stores. In some embodiments, document layout system 1202 includes one or more of the following: a web server, action logger, API-request server, relevance-and-ranking engine, content-object classifier, notification controller, action log, third-party-content-object-exposure log, inference module, authorization/privacy server, search module, user-targeting module, user-interface module, user-profile store, connection store, third-party content store, or location store. The document layout system 1202 may also include suitable components such as network interfaces, security mechanisms, load balancers, failover servers, management-and-network-operations consoles, other suitable components, or any suitable combination thereof.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
    maintaining a content item list that stores an identifier, a position, and dimensions for each of a first content item and a second content item, wherein the dimensions of the first content item include a height and a width of the first content item;
    generating a dynamic document that comprises an arrangement of the first content item and the second content item, the first content item comprising dynamic content, wherein the first content item is different from the second content item, and wherein the dynamic document is automatically generated;
    receiving, from a database, updated dynamic content for the first content item;
    generating updated dimensions for the first content item based on the updated dynamic content for the first content item;
    modifying the content item list to create an updated content item list with the updated dimensions for the first content item;
    detecting, based on the updated content item list, a position conflict between the first content item with the updated dimensions and the second content item based on detecting that the position and an updated height of the first content item interferes with the position and the dimensions of the second content item; and
    generating, in response to detecting the position conflict, a modified position of the second content item within the content item list to resolve the position conflict by modifying the position of the second content item based on the updated height of the first content item, wherein content and the dimensions corresponding to the second content item are maintained after generating the modified position of the second content item; and
    updating the dynamic document based on the updated dynamic content for the first content item, the updated dimensions for the first content item, and the modified position of the second content item in the content item list.

2. The method of claim 1, further comprising generating the content item list by:
    assigning the first content item to a first position; and
    determining a second position for the second content item based on the first position of the first content item, the dimensions of the first content item, and one or more margins of the dynamic document.

3. The method of claim 1, further comprising determining that updating the dimensions of the first content item expands the dimensions of the first content item; and
    wherein generating the modified position of the second content item within the content item list to resolve the position conflict comprises moving the second content item away from the first content item having the updated dimensions until the second content item is at a position that is non-overlapping with the first content item having the updated dimensions.

4. The method of claim 1, wherein:
    detecting that the updated dimensions for the first content item interferes with the dimensions of the second content item comprises detecting that the position plus an updated width of the first content item touches the position of the second content item; and
    generating the modified position of the second content item within the content item list to resolve the position conflict comprises modifying the position of the second content item to a third position determined by adding the position of the first content item with the updated width of the first content item.

5. The method of claim 1, wherein the position plus the updated height of the first content item touches the position of the second content item when a bottom edge of the first content item having the updated height overlaps with the position of the second content item.

6. The method of claim 1, further comprising paginating the dynamic document into a first page and a second page, and wherein modifying the arrangement comprises:
    expanding the first content item having the updated dimensions within the first page of the dynamic document;
    moving the second content item to below the first content item having the updated dimensions on the first page of the dynamic document based on expanding the first content item having the updated dimensions;
    detecting that the second content item overlaps one or more margins of the first page of the dynamic document; and
    moving, based on the detection, the second content item to the second page of the dynamic document.

7. The method of claim 6, further comprising determining that a third content item below the second content item on the second page of the dynamic document is smaller than the second content item; and wherein:
    modifying the arrangement further comprises moving the third content item to the first page of the dynamic document; and
    the third content item fits alongside the first content item and within the one or more margins of the first page of the dynamic document.

8. The method of claim 1, further comprising:
    paginating the dynamic document into a first page and a second page;
    detecting that the first content item having the updated dimensions is larger than the first page;
    splitting the first content item into a first sub-content item and a second sub-content item;
    positioning the first sub-content item on the first page of the dynamic document; and
    positioning the second sub-content item on the second page of the dynamic document.

9. The method of claim 1, further comprising:
    detecting user input narrowing a width of the first content item within the dynamic document;

determining, based on the user input narrowing the width of the first content item, that the second content item fits alongside the first content item within the dynamic document; and moving, based on the determination, the second content item alongside the first content item.

10. The method of claim 1, wherein generating the modified position of the second content item within the content item list to resolve the position conflict comprises:

detecting that the modified the second content item causes an additional position conflict between the second content item at the modified position and a third content item, wherein the third content item has a fixed position within the dynamic document; and updating, based on the third content item having a fixed position, the modified position of the second content item within the content item list to resolve the additional position conflict with third content item without modifying the position of the third content item in the content item list.

11. The method of claim 1, further comprising:

creating, a page delineator between a first page of the dynamic document and a second page of the dynamic document, wherein the page delineator separates the first content item on the first page of the dynamic document and the second content item on the second page of the dynamic document;

expanding, based on receiving the updated dynamic content, the first content item having the updated dimensions to display on both the first page of the dynamic document and the second page of the dynamic document;

moving, in response to displaying the updated content item on both the first page of the dynamic document and the second page of the dynamic document, the page delineator between the second page of the dynamic document and a third page of the dynamic document; and further updating, based on moving the page delineator between the second page of the dynamic document and a third page of the dynamic document, the dynamic document to comprise the second content item to the third page of the dynamic document after the page delineator.

12. The method of claim 1, further comprising:

grouping the first content item and the second content item in a group;

receiving user input adjusting a width of the group; and adjusting the width of the first content item and the width of the second content item proportional to the received user input.

13. The method of claim 1, further comprising:

collecting responses from a plurality of respondents;

analyzing the collected responses to obtain a plurality of results; and organizing the plurality of results into the content items.

14. The method of claim 1, wherein:

the content items comprise a text-based content item having a user-adjustable width;

a height of the text-based content item is determined based on an amount of content within the text-based content item; and the text-based content item overflows from a first page of the dynamic document to a second page of the dynamic document.

15. The method of claim 1, wherein:

the content items comprise an image-based content item having a user-adjustable width and a user-adjustable height; and dimensions of the image-based content item are restricted to dimensions of the dynamic document.

16. A system comprising:

at least one processor; and at least one non-transitory computer-readable storage medium storing instructions that, when executed by the at least one processor, cause the system to:

maintain a content item list that stores an identifier, a position, and dimensions for each of a first content item and a second content item, wherein the dimensions of the first content item include a height and a width of the first content item;

generate a dynamic document that comprises an arrangement of the first content item having dynamic content and the second content item, wherein the first content item is non-overlapping with the second content item, wherein the first content item is different from the second content item, and wherein the dynamic document is automatically generated;

receive, from a database, updated dynamic content for the first content item comprising additional dynamic content;

generate updated dimensions for the first content item based on the updated dynamic content for the first content item;

modify the content item list to create an updated content item list with the updated dimensions for the first content item;

detect, based on the updated content item list, a position conflict between the first content item with the updated dimensions and the second content item based on detecting that the position and an updated height of for the first content item interferes with the position and the dimensions of the second content item; and generate, in response to detecting the position conflict, a modified position of the second content item within the content item list to resolve the position conflict by modifying the position of the second content item based on the updated height of the first content item, wherein content and the dimensions corresponding to the second content item are maintained after generating the modified position of the second content item; and update the dynamic document based on the updated dynamic content for the first content item, the updated dimensions for the first content item, and the modified position of the second content item in the content item list.

17. The system of claim 16, further comprising instructions that cause the system to generate the content item list by:

assigning the first content item to a first position; and determining a second position for the second content item based on the first position of the first content item, the dimensions of the first content item, and one or more margin positions of the dynamic document.

18. A method comprising:

generating a dynamic document that comprises an arrangement of a first content item having dynamic content, a second content item, and a third content item, wherein the second content item is arranged below the first content item, and wherein the third content item is arranged after the second content item, wherein the first content item, the second content item, and the third content item are different from each other, and wherein the dynamic document is automatically generated;

receiving, from a database, updated dynamic content for the first content item;

updating, within the dynamic document, the first content item by expanding the first content item;

moving the second content item to below the updated first content item on a first page of the dynamic document based on expanding the updated first content item;

detecting a margins conflict comprising the second content item overlapping one or more margins of the first page of the dynamic document; and modifying, in response to detecting the margins conflict, the arrangement by:
  determining that the third content item is smaller than the second content item;
  moving the second content item to a second page of the dynamic document; and
  moving the third content item to the first page of the dynamic document based on the third content item being smaller than the second content item, wherein the third content item fits alongside the updated first content item and within the one or more margins of the first page of the dynamic document.

19. The method of claim 18, further comprising maintaining a content item list that stores an identifier, a position, and dimensions for each of the first content item, the second content item, and the third content item, wherein the dimensions of the first content item include a height and a width of the first content item.

20. The method of claim 18, further comprising:
  collecting responses from a plurality of respondents;
  analyzing the collected responses to obtain a plurality of results; and
  organizing the plurality of results into the content items.

* * * * *